(12) United States Patent
Homchaudhuri et al.

(10) Patent No.: US 11,540,221 B2
(45) Date of Patent: Dec. 27, 2022

(54) ADAPTIVE POWER SAVE WITH REINFORCEMENT LEARNING

(71) Applicant: QUALCOMM Incorporated, San Diego, CA (US)

(72) Inventors: Sandip Homchaudhuri, San Jose, CA (US); Pradeep Kumar Yenganti, Cupertino, CA (US); Bhasker Neti, Toopran (IN)

(73) Assignee: QUALCOMM INCORPORATED, San Diego, CA (US)

( * ) Notice: Subject to any disclaimer, the term of this patent is extended or adjusted under 35 U.S.C. 154(b) by 159 days.

(21) Appl. No.: 15/885,003

(22) Filed: Jan. 31, 2018

(65) Prior Publication Data
US 2018/0220372 A1     Aug. 2, 2018

Related U.S. Application Data

(60) Provisional application No. 62/453,489, filed on Feb. 1, 2017.

(51) Int. Cl.
*H04W 52/02* (2009.01)
*H04W 52/22* (2009.01)
*H04W 28/02* (2009.01)

(52) U.S. Cl.
CPC ... *H04W 52/0258* (2013.01); *H04W 52/0216* (2013.01); *H04W 52/0225* (2013.01); *H04W 52/0254* (2013.01); *H04W 52/226* (2013.01); *H04W 28/0284* (2013.01); *Y02D 30/70* (2020.08)

(58) Field of Classification Search
CPC ......... H04W 52/0258; H04W 52/0216; H04W 52/0225; H04W 52/0254; H04W 52/226; H04W 28/0284
See application file for complete search history.

(56) References Cited

U.S. PATENT DOCUMENTS 7,802,118 B1    9/2010   Abdalla et al.
8,102,790 B1    1/2012   Trehus
(Continued)

FOREIGN PATENT DOCUMENTS

CN    104335663 A    2/2015
CN    104885520 A    9/2015
(Continued)

OTHER PUBLICATIONS

Perez-Costa et al., "AU-APSD: Adaptive IEEE 802.11e Unscheduled Automatic Power Save Delivery," 2006 IEEE International Conference on Communications, Istanbul, 2006, pp. 2020-2027. (Year: 2006).*
(Continued)

*Primary Examiner* — Joseph A Bednash
(74) *Attorney, Agent, or Firm* — Holland & Hart LLP

(57) ABSTRACT

Methods, systems, and devices for wireless communication are described. A station may be communicating with an access point during a first active communication period. The communication may be performed in a first power mode. The station may switch to a second power mode to transition to a sleep period. The station may determine, based on traffic indicator metric(s), whether to perform a speculative wakeup and switch to the first power mode at the end of the sleep period.

26 Claims, 14 Drawing Sheets

(56) References Cited

U.S. PATENT DOCUMENTS

| | | | |
|---|---|---|---|
| 9,241,307 B2 | 1/2016 | Merlin et al. | |
| 2007/0184809 A1 | 8/2007 | Muqattash et al. | |
| 2007/0237104 A1* | 10/2007 | Alon | H04W 52/0232 370/311 |
| 2007/0238438 A1* | 10/2007 | Alon | H04W 52/0225 455/343.2 |
| 2013/0028159 A1* | 1/2013 | Vedantham | H04W 52/0232 370/311 |
| 2014/0211676 A1* | 7/2014 | Chhabra | H04W 52/0209 370/311 |
| 2015/0334592 A1* | 11/2015 | Choi | H04W 52/0216 370/311 |
| 2016/0295509 A1 | 10/2016 | Saed et al. | |
| 2017/0195959 A1* | 7/2017 | Park | H04W 52/0216 |

FOREIGN PATENT DOCUMENTS

| | | | |
|---|---|---|---|
| CN | 105050164 A | 11/2015 | |
| EP | 1684466 A1 | 7/2006 | |
| IN | 201404941 I4 * | 7/2016 | H04W 52/0258 |
| TW | 201611631 A | 3/2016 | |
| WO | WO-2014066652 A1 | 5/2014 | |

OTHER PUBLICATIONS

Perez-Costa et al., "AU-APSD: Adaptive IEEE 802.11e Unscheduled Automatic Power Save Delivery," 2006 IEEE International Conference on Communications, Istanbul, 2006, pp. 2020-2027. (Year: 2006).*

X. Perez-Costa and D. Camps-Mur, "AU-APSD: Adaptive IEEE 802.11e Unscheduled Automatic Power Save Delivery," 2006 IEEE International Conference on Communications, Istanbul, 2006, pp. 2020-2027 (Year: 2006).*

International Search Report and Written Opinion—PCT/US2018/016459—ISA/EPO—dated Aug. 1, 2018 (171962WO).

Partial International Search Report—PCT/US2018/016459—ISA/EPO—dated May 11, 2018 (171962WO).

Nayarasi., "CWAP-802.11 Power Management", Oct. 14, 2014, https://mrncciew.com/2014/10/14/cwap-802-11-power-management/, pp. 1-8.

Taiwan Search Report—TW107103616—TIPO—dated Jul. 15, 2021 (171962TW).

* cited by examiner ature ADAPTIVE POWER SAVE WITH
REINFORCEMENT LEARNING

CROSS REFERENCES

The present Application for Patent claims priority to U.S. Provisional Patent Application No. 62/453,489 by HomChaudhuri, et al., entitled "Adaptive Power Save With Reinforcement Learning," filed Feb. 1, 2017, and assigned to the assignee hereof.

BACKGROUND

The following relates generally to wireless communication, and more specifically to adaptive power save with reinforcement learning.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

A STA may communicate with an AP while in an active power mode and may conserve power in between communications by entering a sleep mode. In some cases, a STA may delay transitioning into a sleep mode after transmission or reception of a packet in case a subsequent packet is to be sent or received. For example, the STA may wait for an inactivity timeout (ITO) to expire before entering the sleep mode.

A STA may use an ITO regardless of the type of traffic the STA is transmitting or receiving. But use of the ITO may keep a STA in active mode longer than necessary for some types of traffic. For example, for certain types of traffic, a STA may consume power to remain in active mode in between periodically-scheduled packets, when packets are generally not sent for that type of traffic between the periodically-scheduled packets. Consumption of power while in active mode may reduce the battery life of the STA and negatively impact performance of the STA.

SUMMARY

The described techniques relate to improved methods, systems, devices, or apparatuses that support adaptive power save with reinforcement learning. Generally, the described techniques provide for a wireless device (such as a wireless station (STA)) switching between power modes based on traffic indicator metrics. The traffic indicator metrics may be based on a traffic activity level for the wireless station, a traffic congestion level, downlink and/or uplink traffic activity, throughput level(s) (e.g., downlink throughput and/or uplink throughput levels), and the like. Accordingly, the wireless device may determine whether to perform a speculative wakeup to see if data is buffered at the access point (AP) for the wireless station. When the wireless device determines to perform the speculative wakeup, the wireless device may switch to an active power mode (e.g., a first power mode) and transmit a data NULL message to the AP. The data NULL message may include a power mode indicator bit that is selected to provide an indication of the wireless device being in the active power mode.

In some aspects, the wireless device may additionally or alternatively adapt an inactivity timeout (ITO) look up table (LUT). An ITO LUT may be used by a STA to adjust a duration of an ITO period. However, there may be instances when the LUT itself may be adjusted. Therefore, in some aspects, the wireless device may apply reinforcement learning, e.g., use a closed loop feedback based on multi-dimensional cost function maximization against a reward in order to adjust the ITO LUT. The cost metrics may include metric(s) the device monitors during an observation window. The metrics may be associated with the number of data traffic indication messages (DTIM) the wireless device receives during the observation window, the number of speculative wakeups that result in data communications, and the like. Accordingly, the wireless device may use the metric(s) to update the ITO LUT by changing the length of the inactivity timer(s) used during a speculative wakeup, and the like.

A method of wireless communication is described. The method may include communicating, while in a first power mode, with an AP during a first active communication period, switching to a second power mode to transition to a sleep period, and determining, based at least in part on a traffic indicator metric, whether to perform a speculative wakeup and switch to the first power mode at the end of the sleep mode.

An apparatus for wireless communication is described. The apparatus may include means for communicating, while in a first power mode, with an AP during a first active communication period, means for switching to a second power mode to transition to a sleep period, and means for determining, based at least in part on a traffic indicator metric, whether to perform a speculative wakeup and switch to the first power mode at the end of the sleep mode.

Another apparatus for wireless communication is described. The apparatus may include a processor, memory in electronic communication with the processor, and instructions stored in the memory. The instructions may be operable to cause the processor to communicate, while in a first power mode, with an AP during a first active communication period, switch to a second power mode to transition to a sleep period, and determine, based at least in part on a traffic indicator metric, whether to perform a speculative wakeup and switch to the first power mode at the end of the sleep mode.

A non-transitory computer readable medium for wireless communication is described. The non-transitory computer-readable medium may include instructions operable to cause a processor to communicate, while in a first power mode, with an AP during a first active communication period, switch to a second power mode to transition to a sleep period, and determine, based at least in part on a traffic indicator metric, whether to perform a speculative wakeup and switch to the first power mode at the end of the sleep mode.

Some examples of the method, apparatus, and non-transitory computer-readable medium described above may further include processes, features, means, or instructions for determining to perform the speculative wakeup and switch to the first power mode. Some examples of the method, apparatus, and non-transitory computer-readable medium described above may further include processes, features, means, or instructions for transmitting a data null message that comprises a power management bit, the power management bit being set to zero to facilitate switching to the first power mode.

Some examples of the method, apparatus, and non-transitory computer-readable medium described above may further include processes, features, means, or instructions for determining that a traffic activity level during the first active communication period may have exceeded a threshold value, wherein the traffic indicator metric may be based at least in part on the traffic activity level exceeding the threshold value.

Some examples of the method, apparatus, and non-transitory computer-readable medium described above may further include processes, features, means, or instructions for determining that a traffic congestion level may have exceeded a threshold value, wherein the traffic indicator metric may be based at least in part on the traffic congestion level exceeding the threshold value.

Some examples of the method, apparatus, and non-transitory computer-readable medium described above may further include processes, features, means, or instructions for identifying an observation window associated with a plurality of speculative wakeups. Some examples of the method, apparatus, and non-transitory computer-readable medium described above may further include processes, features, means, or instructions for determining whether a downlink activity level during a predetermined number of the plurality of speculative wakeups may have exceeded a first threshold value. Some examples of the method, apparatus, and non-transitory computer-readable medium described above may further include processes, features, means, or instructions for determining whether an uplink activity level during the predetermined number of the plurality of speculative wakeups may have exceeded a second threshold value, wherein the traffic indicator metric may be based at least in part on the downlink and uplink activity levels exceeding the first and second threshold values.

Some examples of the method, apparatus, and non-transitory computer-readable medium described above may further include processes, features, means, or instructions for identifying an observation window associated with a plurality of speculative wakeups. Some examples of the method, apparatus, and non-transitory computer-readable medium described above may further include processes, features, means, or instructions for determining whether a downlink throughput level during a predetermined number of the plurality of speculative wakeups may have exceeded a first threshold value. Some examples of the method, apparatus, and non-transitory computer-readable medium described above may further include processes, features, means, or instructions for determining whether an uplink throughput level during the predetermined number of the plurality of speculative wakeups may have exceeded a second threshold value, wherein the traffic indicator metric may be based at least in part on the downlink and uplink throughput levels exceeding the first and second threshold values.

Some examples of the method, apparatus, and non-transitory computer-readable medium described above may further include processes, features, means, or instructions for identifying an observation window associated with a plurality of speculative wakeups. Some examples of the method, apparatus, and non-transitory computer-readable medium described above may further include processes, features, means, or instructions for determining whether a downlink activity level during the observation window has exceeded a first threshold value. Some examples of the method, apparatus, and non-transitory computer-readable medium described above may further include processes, features, means, or instructions for determining whether an uplink activity level during the observation window has exceeded a second threshold value, wherein the traffic indicator metric may be based at least in part on the downlink and uplink activity levels exceeding the first and second threshold values.

Some examples of the method, apparatus, and non-transitory computer-readable medium described above may further include processes, features, means, or instructions for identifying an observation window associated with a plurality of speculative wakeups. Some examples of the method, apparatus, and non-transitory computer-readable medium described above may further include processes, features, means, or instructions for determining whether a downlink throughput level during the observation window has exceeded a first threshold value. Some examples of the method, apparatus, and non-transitory computer-readable medium described above may further include processes, features, means, or instructions for determining whether an uplink throughput level during the observation window has exceeded a second threshold value, wherein the traffic indicator metric may be based at least in part on the downlink and uplink throughput levels exceeding the first and second threshold values.

Some examples of the method, apparatus, and non-transitory computer-readable medium described above may further include processes, features, means, or instructions for determining that a previous speculative wakeup failed to result in data communications. Some examples of the method, apparatus, and non-transitory computer-readable medium described above may further include processes, features, means, or instructions for determining not to perform the speculative wakeup and switch to the first power mode.

Some examples of the method, apparatus, and non-transitory computer-readable medium described above may further include processes, features, means, or instructions for using a first inactivity timeout (ITO) associated with the first active communication period. Some examples of the method, apparatus, and non-transitory computer-readable medium described above may further include processes, features, means, or instructions for using a second ITO associated with the speculative wakeup, wherein the second ITO may be shorter in time than the first ITO.

Some examples of the method, apparatus, and non-transitory computer-readable medium described above may further include processes, features, means, or instructions for determining that data may be being communicated during a speculative wakeup. Some examples of the method, apparatus, and non-transitory computer-readable medium described above may further include processes, features, means, or instructions for switching from the second ITO to the first ITO during the speculative wakeup.

Some examples of the method, apparatus, and non-transitory computer-readable medium described above may further include processes, features, means, or instructions for determining that a beacon transmission time may be within a predefined time period from the end of the sleep period. Some examples of the method, apparatus, and non-transitory computer-readable medium described above may further include processes, features, means, or instructions for determining, based at least in part on the beacon transmission time, not to perform a speculative wakeup and switch to the first power mode.

Some examples of the method, apparatus, and non-transitory computer-readable medium described above may further include processes, features, means, or instructions for detecting, during the sleep period, that a voice call may be ongoing. Some examples of the method, apparatus, and non-transitory computer-readable medium described above may further include processes, features, means, or instructions for determining, based at least in part on the ongoing voice call, to perform the speculative wakeup and switch to the first power mode.

A method of wireless communication is described. The method may include monitoring, at a wireless station and during an observation window, one or more metrics associated with power mode changes, updating one or more values of an ITO LUT based on the one or more metrics, and updating an ITO period based at least in part on the updated ITO LUT.

An apparatus for wireless communication is described. The apparatus may include means for monitoring, at a wireless station and during an observation window, one or more metrics associated with power mode changes, means for updating one or more values of an ITO LUT based on the one or more metrics, and means for updating an ITO period based at least in part on the updated ITO LUT.

Another apparatus for wireless communication is described. The apparatus may include a processor, memory in electronic communication with the processor, and instructions stored in the memory. The instructions may be operable to cause the processor to monitor, at a wireless station and during an observation window, one or more metrics associated with power mode changes, update one or more values of an ITO LUT based on the one or more metrics, and update an ITO period based at least in part on the updated ITO LUT.

A non-transitory computer readable medium for wireless communication is described. The non-transitory computer-readable medium may include instructions operable to cause a processor to monitor, at a wireless station and during an observation window, one or more metrics associated with power mode changes, update one or more values of an ITO LUT based on the one or more metrics, and update an ITO period based at least in part on the updated ITO LUT.

In some examples of the method, apparatus, and non-transitory computer-readable medium described above, monitoring one or more metrics associated with power mode changes further comprises: monitoring, during the observation window, a number of TIM messages received for the wireless station. Some examples of the method, apparatus, and non-transitory computer-readable medium described above may further include processes, features, means, or instructions for updating a rate for performing speculative wakeups based at least in part on the number of TIM messages received for the wireless station.

Some examples of the method, apparatus, and non-transitory computer-readable medium described above may further include processes, features, means, or instructions for updating the ITO LUT to extend the ITO period based on the number of TIM messages exceeding a threshold value.

In some examples of the method, apparatus, and non-transitory computer-readable medium described above, monitoring one or more metrics associated with power mode changes further comprises: monitoring, during the observation window, a number of speculative wakeups that result in data communications.

In some examples of the method, apparatus, and non-transitory computer-readable medium described above, monitoring one or more metrics associated with power mode changes further comprises: monitoring, during the observation window, a latency for data communications associated with the wireless station. Some examples of the method, apparatus, and non-transitory computer-readable medium described above may further include processes, features, means, or instructions for updating a rate for performing speculative wakeups based at least in part on the latency for data communications associated with the wireless station.

Some examples of the method, apparatus, and non-transitory computer-readable medium described above may further include processes, features, means, or instructions for updating the ITO LUT to contract an ITO period based on the number of speculative wakeups resulting in data communications falling below a threshold value.

In some examples of the method, apparatus, and non-transitory computer-readable medium described above, monitoring one or more metrics associated with power mode changes further comprises: monitoring, during the observation window, a round trip time (RTT) of traffic to and from the wireless station.

Some examples of the method, apparatus, and non-transitory computer-readable medium described above may further include processes, features, means, or instructions for monitoring a traffic congestion metric. Some examples of the method, apparatus, and non-transitory computer-readable medium described above may further include processes, features, means, or instructions for referencing the ITO LUT table to determine the updated ITO period based on the traffic congestion metric.

DETAILED DESCRIPTION

Figure 1:
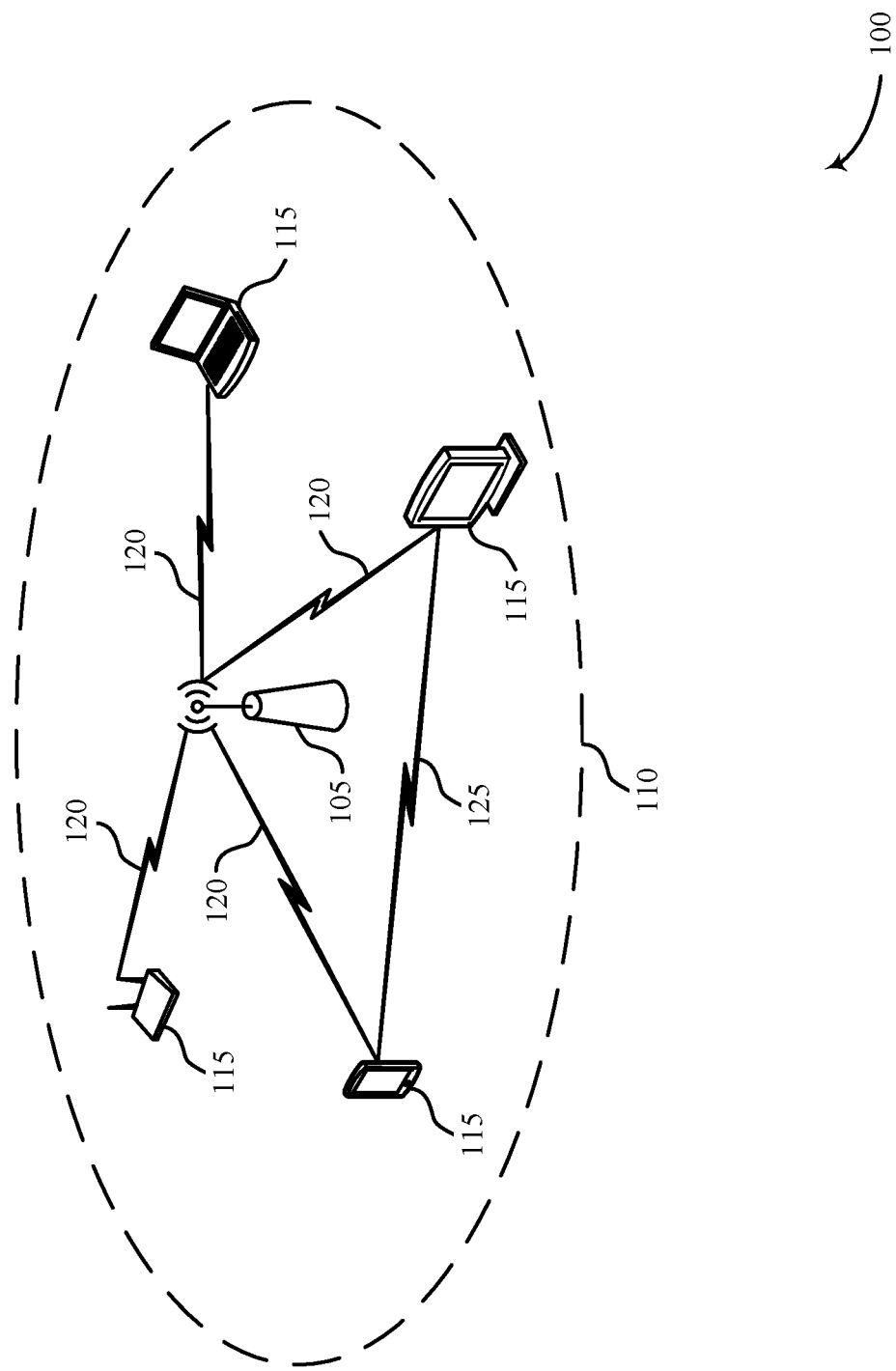
FIG. 1 illustrates an example of a system for wireless communication that supports adaptive power save with reinforcement learning in accordance with aspects of the present disclosure.

The described features generally relate to improved power saving for a wireless device (e.g., a wireless station (STA)). The STA may reduce power consumption by detecting metrics observed in real time and/or during an observation window to selectively enter different power modes based on the metrics. For example, the STA may enter a power save mode and monitor the metrics to determine whether and/or when to perform a speculative wakeup procedure where the STA switches to an active power mode and waits for data to be received. When no data is received, the STA may wait for an inactivity timeout (ITO) period and then switch back to the power save mode. In some examples, the STA may communicate with an access point (AP) over unlicensed spectrum. For example, the STA may participate in a voice call with the AP using Voice-over Wi-Fi (VoWi-Fi).

The STA may be capable of operating in various power modes which consume varying amounts of power and which support different transmission schemes. For example, a STA may operate in a first power mode that supports the reception of multiple packets in response to a single poll sent to an AP. The first power mode may consume comparatively more power than a second power mode, such as a sleep mode. In the second power mode, the STA may, in some examples, support the reception of a single packet from the AP. Additionally, the first power mode may prohibit entry into power collapse (e.g., a sleep mode) and the second power mode may facilitate entry into power collapse. A STA that is capable of receiving or transmitting packets may be referred to herein as being in active mode. Thus, a STA may be in active mode in either one of the first or second power modes and the STA may enter a sleep mode from the second power mode.

A STA may communicate while in the first power mode (e.g., to take advantage of the high downlink data rate supported by the first power mode) and reserve the second power mode for transitioning to sleep mode. For example, in between transmitting or receiving packets in the first power mode the STA may switch to the second power mode so that the STA can enter sleep mode, thereby conserving power. In some cases, the STA may wait for an inactivity timeout (ITO) after communication of a packet and before switching to the second power mode. For instance, the STA may wait to see if a packet is communicated during the ITO and, if no packet is received, the STA may enter sleep mode. But if the ITO duration is not set to be an appropriate value, the STA may miss opportunities for entering the sleep mode or may be asleep when incoming traffic arrives. For example, if the ITO is too short, a STA may prematurely enter the sleep mode after reception of a packet, missing a subsequent packet. In such a scenario, the AP involved in the data communication may buffer packets until the STA awakes, which can introduce latency into the communications. Alternatively, if the ITO duration is too long, the STA may delay entering the sleep mode and in doing so consume excess power or, in some cases, miss the opportunity to enter a sleep mode altogether where the ITO length extends to the buffered data packet.

In some cases, a STA may use ITO regardless of the type of communication in which it is involved. For example, the STA may use ITO during a voice call in which voice packets are sent according to a periodic schedule. In such cases, the STA communicates exclusively in the first power mode and transition (e.g., after the ITO) to the second power mode in order to enter sleep mode. Thus, the STA transitions between power modes each time it enters sleep mode. Transitioning between power mode and waiting for the ITO delays entrance into sleep mode, which may cause the STA to consume excessive power.

According to the techniques described herein, a STA may monitor metric(s) associated with communication in which it is participating and adjust its power mode to accommodate the metrics. For instance, the STA may monitor transmission/reception (TX/RX) activity during the current wakeup period to see if the TX/RX activity lasted beyond a predetermined percentage of the total active time. Additionally or alternatively, the STA may determine if the current congestion level is above a threshold amount (e.g., depending on the communication scenario). In some aspects, the metrics may be based on observations during an observation window, e.g., whether wakeup periods result in TX/RX with the AP, based on the total number of wakeups, etc. The STA may use these metrics to determine whether to perform a wakeup procedure to monitor for additional data.

Additionally or alternatively, the STA may derive a cost/benefit analysis using certain observations and update an ITO look up table (LUT) based on the cost/benefit analysis. Updating the ITO LUT may occur in an ongoing basis such that the STA continuously learns what the optimal number of speculative wakeup procedures to perform and/or the optimal duration of the speculative wakeup ITO.

Aspects of the disclosure are further illustrated by and described with reference to apparatus diagrams, system diagrams, and flowcharts that relate to adaptive power save with reinforcement learning FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier sense multiple access/collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of an request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some cases, a STA 115 may conserve power by shutting down its transmit path in between transmissions. A STA 115 can further save power by entering a power save mode in which the STA 115 shuts down its receive path. The STA 115 can inform an AP 105 of the amount of time the STA 115 will be in power save mode by sending an indication to the AP 105 (e.g., by sending a null packet with the Power Management bit set). Upon reception of the indication, the AP 105 may store packets that addressed to the STA 115. In some cases, the AP 105 may send a traffic indication map (TIM) in a beacon that informs the STA 115 of the data that is buffered at the AP 105. The STA 115 may intermittently wake up (e.g., according to Listen Intervals) to check for and/or receive TIMs. In response to a TIM, the STA 115 may send a message to the AP indicating that the STA 115 is ready to receive the buffered data. The AP 105 may send a downlink packet to the STA 115 in response to the message. A STA 115 may exit power save mode by sending an indication to the AP 105 (e.g., by transmitting a null packet to the AP 105 with the Power Management bit cleared). In some cases, the STA 115 may increase the rate that downlink data is received by entering a power mode that supports reception of multiple queued downlink packets at the discretion of the AP 105, as opposed to one downlink packet per transmission. Thus, depending on the power mode of the STA 115, the AP 105 may send multiple packets to the STA 115, a single packet, or no packets.

As described herein, a STA 115 may, in some cases, implement speculative wakeup procedures. The wakeup may be speculative in that the STA 115 switches from a sleep mode to an active mode even though the STA 115 does not know whether the AP 105 has data to transmit. A speculative wakeup may include the STA 115 transmitting a null message with a power management bit set to indicate that the STA 115 is in an active power mode. For example, a STA 115 may be communicating, while in a first power mode, with an AP during a first active communication period. The STA 115 may switch to a second power mode to transition to a sleep period. The STA 15 may determine, based at least in part on a traffic indicator metric, whether to perform a speculative wakeup and switch to the first power mode at the end of the sleep mode Additionally or alternatively, the STA 115 may monitor, during an observation window, metric(s) associated with power mode changes. The STA 115 may update one or more values of an ITO LUT based on the metric(s). The STA 115 may update an ITO period based at least in part on the updated ITO LUT.

Figure 2:
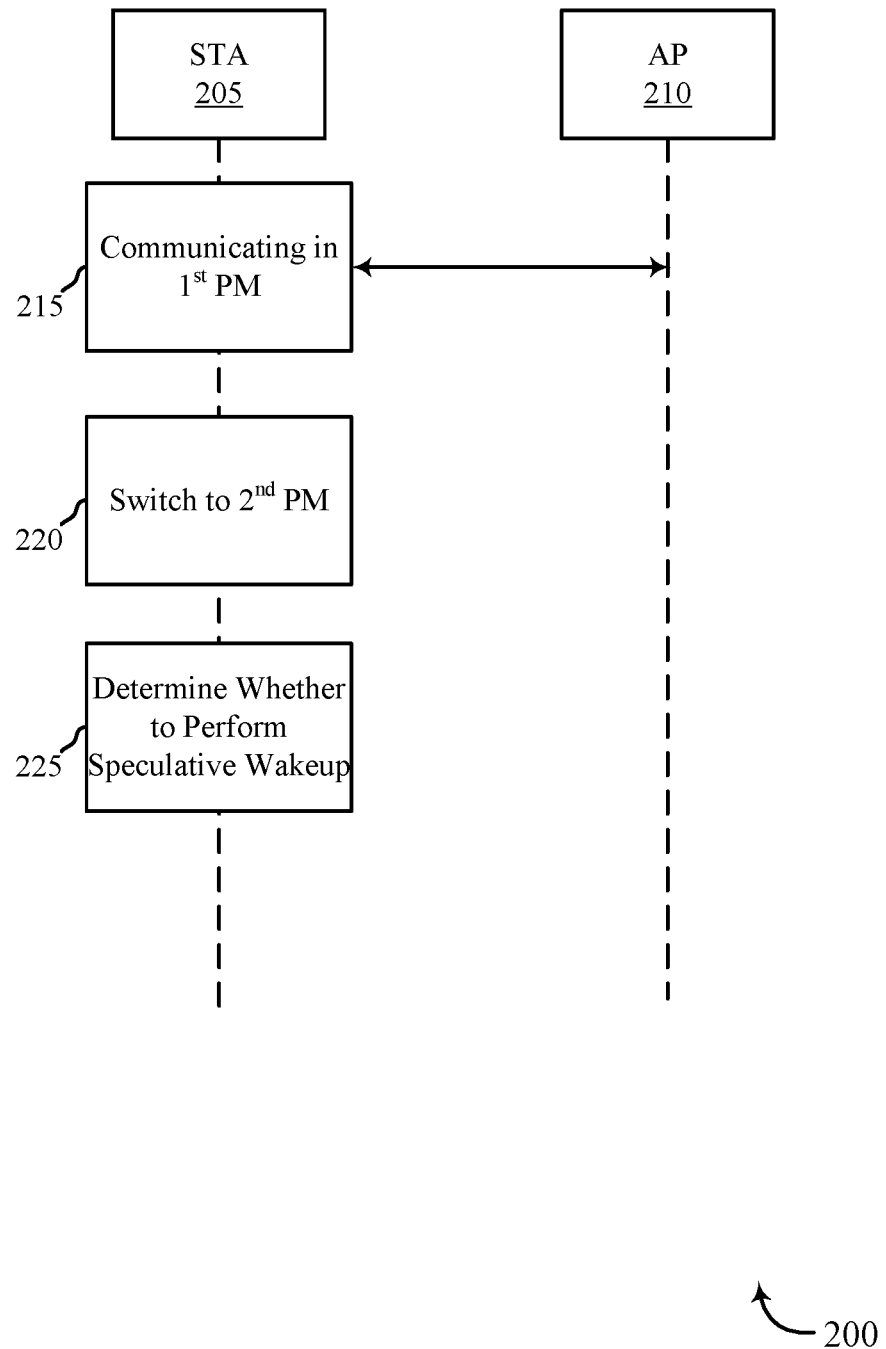
FIG. 2 illustrates an example of a process that supports adaptive power save with reinforcement learning in accordance with aspects of the present disclosure.

FIG. 2 illustrates an example of a process 200 that supports adaptive power save with reinforcement learning in accordance with various aspects of the present disclosure. Process 200 may implement aspect(s) of WLAN 100 of FIG. 1. Process 200 may include a STA 205 and an AP 210, which may be examples of the corresponding devices described herein.

Traditional power save techniques relied on a power-save poll (PS-Poll) message to retrieve data buffered at AP 210. These techniques, for example, used traffic congestion and TIM messages from the AP 210 to determine when to transit the speculative PS-Poll message(s). Such techniques, however, suffer from malfunctions and AP lockup due to such issues as the APs not reacting to scheduled and/or unscheduled PS-Poll messages, the APs crashing when receiving a certain number (in some instances even one) of unscheduled PS-Poll messages, and the like. In response, these APs were configured to disable power save mode and revert to a fixed ITO interval (e.g., 200 ms).

In some traditional systems, APs that go into crash state when PS-Poll is received and there is no data to send may result in denial of service and crashing the entire network. In some traditional systems, APs that can process regular PS-Polls, but not speculative PS-Poll, may not respond to speculative PS-Polls resulting in impact on data services. Other APs that respond to speculative PS-Polls in some instances, but not in every instance. Some APs that may inconsistently respond to PS-Polls may result in performance degradation during peak key performance indicator tests.

Broadly, process 200 illustrates an example where STA 205 uses quality of service (QoS) nulls (e.g., including a power mode bit (PM) set to 0) to retrieve buffered data from AP 210. STA 205 may include multiple sets of ITO LUTs and select between the ITO LUTs based on adaptive learning. STA 205 may use a learning based approach which continuously monitors multiple metrics and decides if a power mode change should be performed. The speculative wakeup may be performed after any transition from PM0 to PM1 (depending on the metrics), rather than in response to a TIM message to STA 205. In some aspects, the ITO period may be set to a minimum value, e.g., 15 milliseconds (ms).

Generally, STA 205 may operate according to a first power mode, which may be referred to herein as PM0 (or PM=0), and a second power mode, which may be referred to herein as PM1 (or PM=1). STA 205 operating in PM0 may consume more power than when operating in PM1. Also, STA 205 operating in PM0 may be available to receive multiple packets (e.g., data) from AP 210, while STA 205 operating in PM1 may not receive packets from AP 210.

At 215, STA 205 may be communicating with AP 210 during a first active communication period. The communication may be performed while STA 205 is in a first power mode. The communication may be in response to a TIM message received from AP 210, in response to a previous speculative wakeup procedure that resulted in data communications, etc. The first power mode may be a PM0 mode where STA 205 transmitted a message to STA 210 with a power management (PM) bit set to zero.

At 220, STA 205 may switch to a second power mode to transition to a sleep period. The second power mode may be a PM1 mode. In some aspects, while in the second power mode, STA 205 may not be configured to communicate with AP 210, e.g., exchange data packets. In some aspects, while in the second power mode, STA 205 may be configured for limited communications with AP 210, e.g., STA 205 may monitor a beacon transmitted by AP 210.

At 225, STA 205 may determine whether to perform a speculative wakeup and switch back to the first power mode. The determination may be based on a traffic indicator metric(s). In some aspects, STA 205 may, after every transition to PM=1, determine if a speculative wakeup is needed (for PM change from 1 to 0).

In some aspects, a speculative wakeup may be performed if TX/RX activity in the current wakeup period has lasted beyond a predefined percentage of the total active time. For example, if STA 205 spent more than 25%, 30%, 50%, or some other percentage of the total active time in the current wakeup period performing active communications with AP 210, then STA 205 may determine that a speculative wakeup may be beneficial. This may filter out unnecessary speculative wakeups for sporadic traffic and save power of STA 205.

In some aspects, a speculative wakeup may be performed if the current congestion threshold is more than a predefined percentage, which may also depend on the operating configurations. In some examples, different predefined percentages may be identified for different operating modes. As one non-limiting example, traffic congestion exceeding 50% may indicate a speculative wakeup is beneficial when operating in 2G and traffic congestion exceeding 30% may indicate a speculative wakeup is beneficial when operating in 5G. This may address a typical open mode/congested environment usage scenario.

In some aspects, a speculative wakeup may be performed based on observations during an observation window. For example, STA 205 may identify an observation window in which to monitor certain metrics. In one non-limiting example, an observation window may span a two second period. During the observation window, a speculative wakeup may be performed if there are at least a certain number of wakeups, e.g., six wakeups during the observation window. Additionally or alternatively, the speculative wakeup may be performed if number of wakeups with transmit activity more than a first threshold value and if the number of wakeups with receive activity is more than a second threshold value are satisfied. This may identify bidirectional low throughput use cases to handle request/response kind of use cases (which may help with latency/voice-over-Wi-Fi use cases, etc.).

The traffic indicator metrics may also be based on throughput metrics. For example, a speculative wakeup may be performed if the transmit throughput is more than a first threshold value and the receive throughput is more than a second threshold value. This may identify typical real applications such as file download, video streaming, etc., which use transmission control protocols (TCP). Since TCP is bidirectional and latency sensitive, this priority treatment involving performing speculative wakeups may support the latency configurations.

In some aspects, STA 205 may determine not to perform a speculative wakeup. For example, a speculative wakeup may be avoided if the current wakeup continues to be a speculative wakeup (e.g., no TX/RX activity during the current speculative wakeup). In some aspects, a speculative wakeup may be avoided when the current ITO is greater than a threshold period.

In some aspects, the speculative wakeup may include an alternative ITO. For example, as the power management change/wakeup is speculative in nature, using a primary ITO may not be power efficient or performance efficient. Thus, STA 205 may use an alternate ITO during the speculative wakeup if there is no TX/RX activity. The alternative ITO values may be smaller (contracted) or larger (stretched) from the primary ITO based on the described learning techniques, e.g., based on the traffic indicator metrics. STA 205 may switch from the alternative ITO to the primary ITO if any TX/RX activity happens during the current speculative wakeup. As can be appreciated, once this switch happens, the current wakeup would no longer be considered a speculative wakeup.

In some aspects, the speculative wakeup may also be avoided (or not performed) if the next target beacon transmit time (TBTT) is within a predefined time period from the speculative wakeup. This may be based on the beacon including whether there is data traffic for STA 205.

Figure 3:
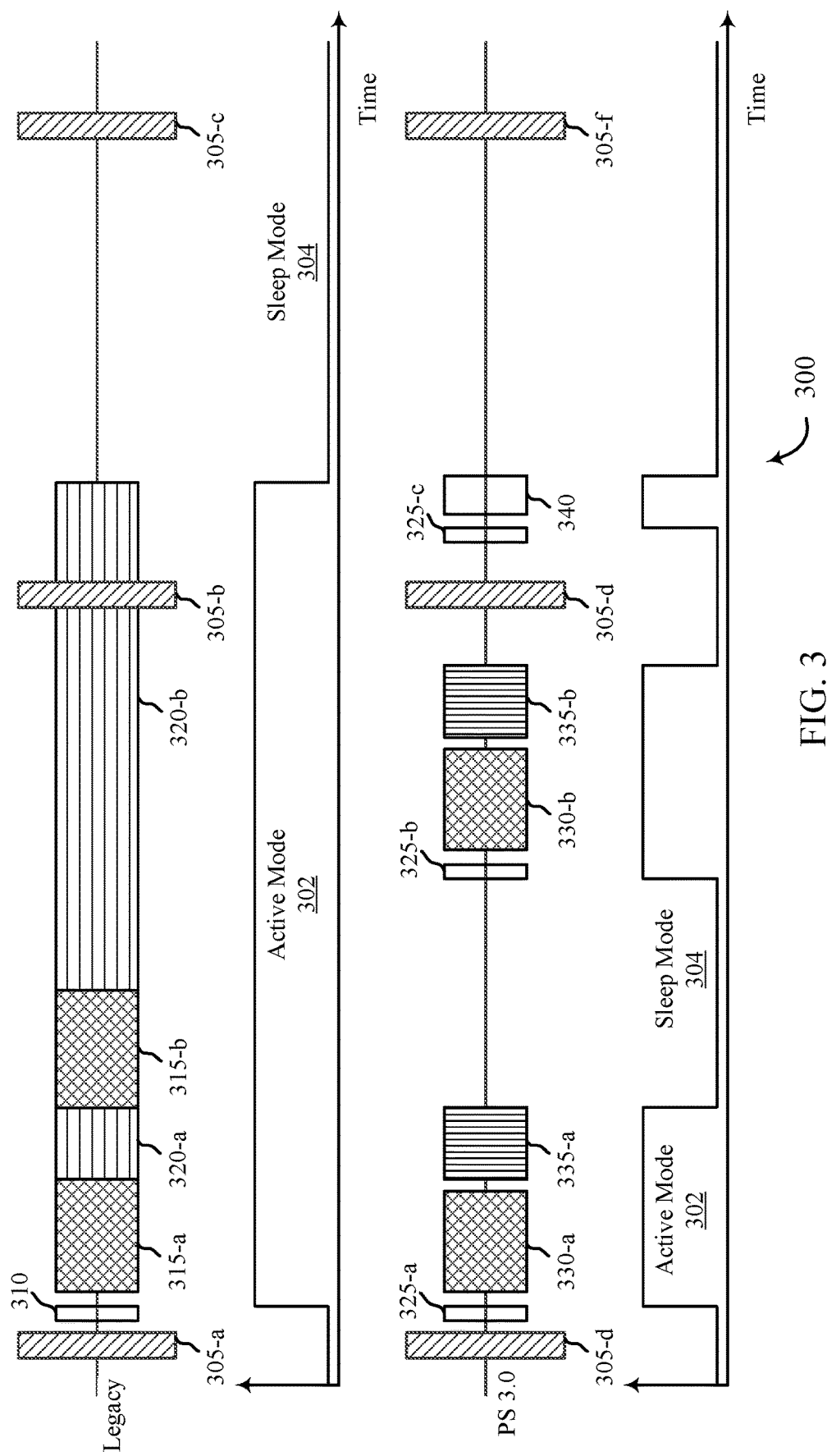
FIG. 3 illustrates an example of a power save configuration that supports adaptive power save with reinforcement learning in accordance with aspects of the present disclosure.

FIG. 3 illustrates an example of a power save configuration 300 that supports adaptive power save with reinforcement learning in accordance with various aspects of the present disclosure. Power save configuration 300 may implement aspect(s) of WLAN 100 and/or process 200 described above. Power save configuration 300 may be implemented by a STA and/or AP, which may be examples of the corresponding devices described herein.

Power save configuration 300 shows two example power save configurations, a legacy power save configuration and a power save configuration according to the described techniques (identified as PS 3.0, which may also be called QPower 3.0). Broadly, the power save configuration PS 3.0 includes buffered data at an AP being advertised in a beacon. The STA fetches the data and performs one speculative wakeup.

The legacy power save mode may include an AP transmitting a plurality of beacons 305, with beacons 305-*a*, 305-*b*, and 305-*c* being shown by way of example. The beacon 305-*a* may be a TIM beacon that includes an indication to the STA that the AP has data buffered for the STA. In response to the TIM beacon 305-*a*, the STA may transmit a power mode change 310 which includes a power mode bit set to zero (e.g., a first power mode). When the STA transmits the power mode change 310, the STA switches to an active mode 302 where the STA uses an increased amount of power. In response, the AP and the STA may exchange data during data period 315-*a*. However, all of the data may not be exchanged during data period 315-*a* and the STA may enter into a fixed ITO (e.g., 200 ms ITO) during ITO period 320-*a*. However, as the AP still has data to exchange with the STA, ITO period 320-*a* may be interrupted by data being exchanged during data period 315-*b*. Once the data has been exchanged, the STA may again enter the fixed ITO period (e.g., ITO period 320-*b*). ITO period 320-*b* may run the full fixed period before the STA enters a sleep mode. Once the ITO period 320-*b* is complete, the STA enters a sleep mode 304 where power is conserved. As illustrated in power save configuration 300, the legacy power save mode includes the STA being in an active mode 302 for an extended period of time, which is an inefficient use of the STA power resources.

The power save mode corresponding to the presently described techniques, however, provides a more efficient use of the resources of the STA and reduces the amount of time the STA spends in the active mode 302. The power save 3.0 mode may include the AP transmitting a plurality of beacons 305, with beacons 305-*d*, 305-*e*, and 305-*f* being shown by way of example. The beacon 305-*d* however may be a TIM beacon that includes an indication to the STA that the AP has data buffered for the STA. In response to the TIM beacon 305-*d*, the STA may transmit a power mode change 325-*a* which includes a power mode bit set to zero (e.g., a first power mode). When the STA transmits the power mode change 325-*a*, the STA switches to an active mode 302. In response, the AP and the STA may exchange data during data period 330-*a*. However, all of the data may not be exchanged during data period 330-*a* and the STA may enter into a first ITO period, e.g., during ITO period 335-*a*, that is a shortened ITO period (e.g., shorter than 200 ms). The STA may switch to a second power mode and enter the sleep mode 304 after the ITO period 335-*a*. The AP may still have data to exchange with the STA, but may not transmit the data during the ITO period 335-*a*. Accordingly, the STA may switch to the sleep mode 304 for a sleep period to conserve power. The AP may buffer the data for the STA that wasn't exchanged during the data period 330-*a*

Subsequently, the STA may determine to perform a speculative wakeup in accordance with the described techniques. For example, the STA may monitor the traffic indicator metrics while in the sleep mode 304 and determine that (and when) to perform the speculative wakeup. The speculative wakeup may include the STA transmitting a power mode change 325-*b* to the AP. Accordingly, data may be exchanged during data period 330-*b* between the AP and the STA. Once the STA begins exchanging the data with the AP, the current wakeup would no longer be considered a speculative wakeup. Once the data is exchanged during the data period 330-*b*, the STA may wait for additional data during ITO period 335-*b*. ITO period 335-*b* may be similar to ITO period 335-*a* and may provide for the STA to switch from the active mode 302 to the sleep mode 304 quicker than with fixed ITO periods.

Subsequently, the STA may again determine to perform a speculative wakeup in accordance with the described techniques. Thus, the STA may transmit a power mode change 325-*c* to the AP with the power management bit set to zero. The STA may then wait for a data exchange during an alternative ITO period 340. The alternative ITO period 340 may be based on an ITO LUT that is continuously updated according to the described techniques. At the end of the alternative ITO period 340 and with no data being exchanged, the STA may again switch to the sleep mode 304 to conserve power.

Figure 4:
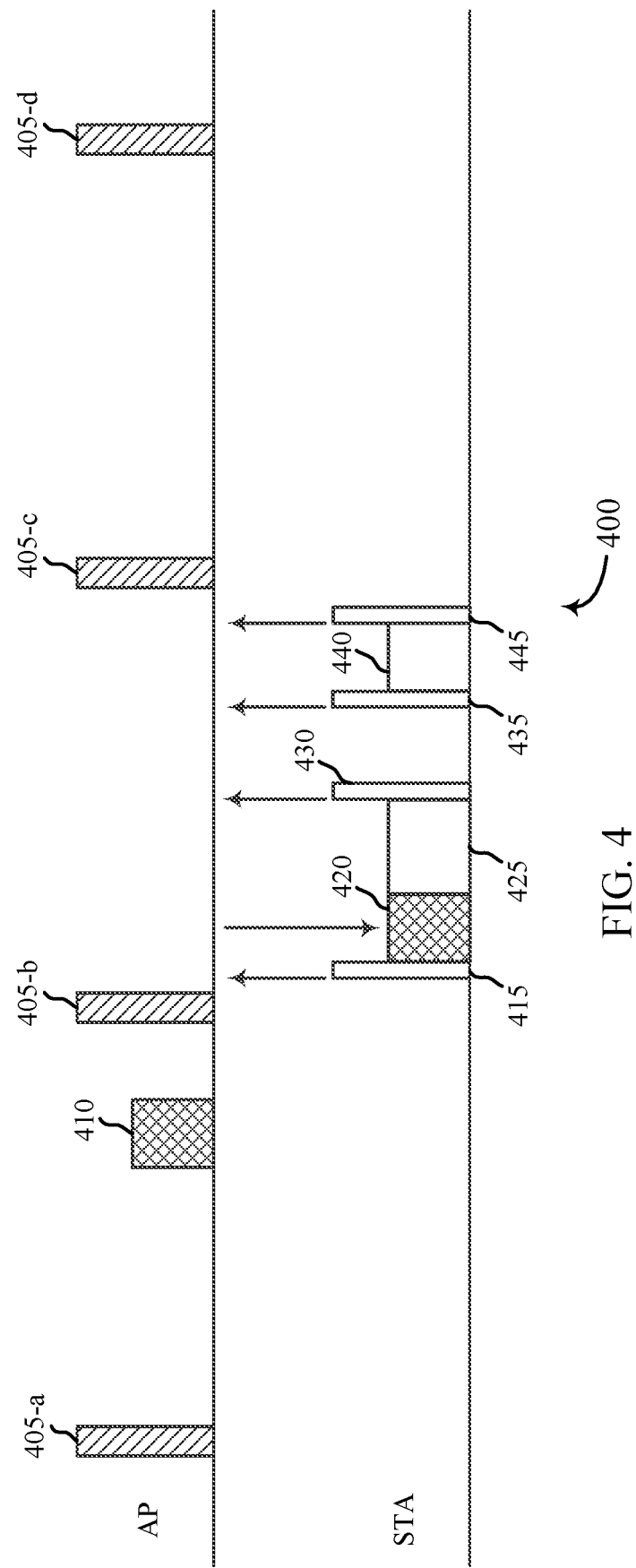
FIG. 4 illustrates an example of a power save configuration that supports adaptive power save with reinforcement learning in accordance with aspects of the present disclosure.

FIG. 4 illustrates an example of a power save configuration 400 that supports adaptive power save with reinforcement learning in accordance with various aspects of the present disclosure. Power save configuration 400 may implement aspect(s) of WLAN 100, process 200, and/or power save configuration 300 described above. Power save configuration 400 may be implemented by a STA and/or AP, which may be examples of the corresponding devices described herein.

Power save configuration 400 may include an AP transmitting beacons 405, with beacons 405-*a*, 405-*b*, 405-*c*, and 405-*d* being shown by way of example. The AP may receive data 410 buffered for the STA. Accordingly, the beacon 405-*b* may be a TIM beacon that conveys an indication that the AP has data stored for the STA.

The STA may receive the TIM beacon 405-*b* and respond by transmitting a power mode change 415 to the AP. The power mode change 405 may include or be a data null message that includes a power mode bit set to zero to indicate that the STA has entered an active mode. In response to the power mode change 415, the AP may transmit and the STA may receive the data during data period 420. In this example, all of the data being buffered at the AP is received during the data period 420. Once the data has been exchanged, the STA may initiate an inactivity timer during ITO period 425. The ITO period 425 may be a common ITO period which may be shorter than a fixed ITO period (e.g., as used in the legacy power save configuration), but may be longer than an alternative ITO period. At the end of the ITO period 425 and with no data being exchanged, the STA may transmit a power mode change 430 to the AP that indicates the STA is entering a sleep mode. For example, the power mode change 430 may include a power mode bit set to one to indicate that the STA is entering a sleep mode.

Subsequently, the STA may determine to perform a speculative wakeup in accordance with the described techniques. For example, the STA may monitor the traffic indicator metrics while in the sleep mode and determine if and when to perform the speculative wakeup. Thus, the STA may transmit a power mode change 435 to the AP with the power management bit set to zero. The STA may then wait for a data exchange during an alternative ITO period 440. The alternative ITO period 440 may be based on an ITO LUT that is continuously updated according to the described techniques. At the end of the alternative ITO period 440 and with no data being exchanged, the STA may again switch to the sleep mode to conserve power.

Figure 5:
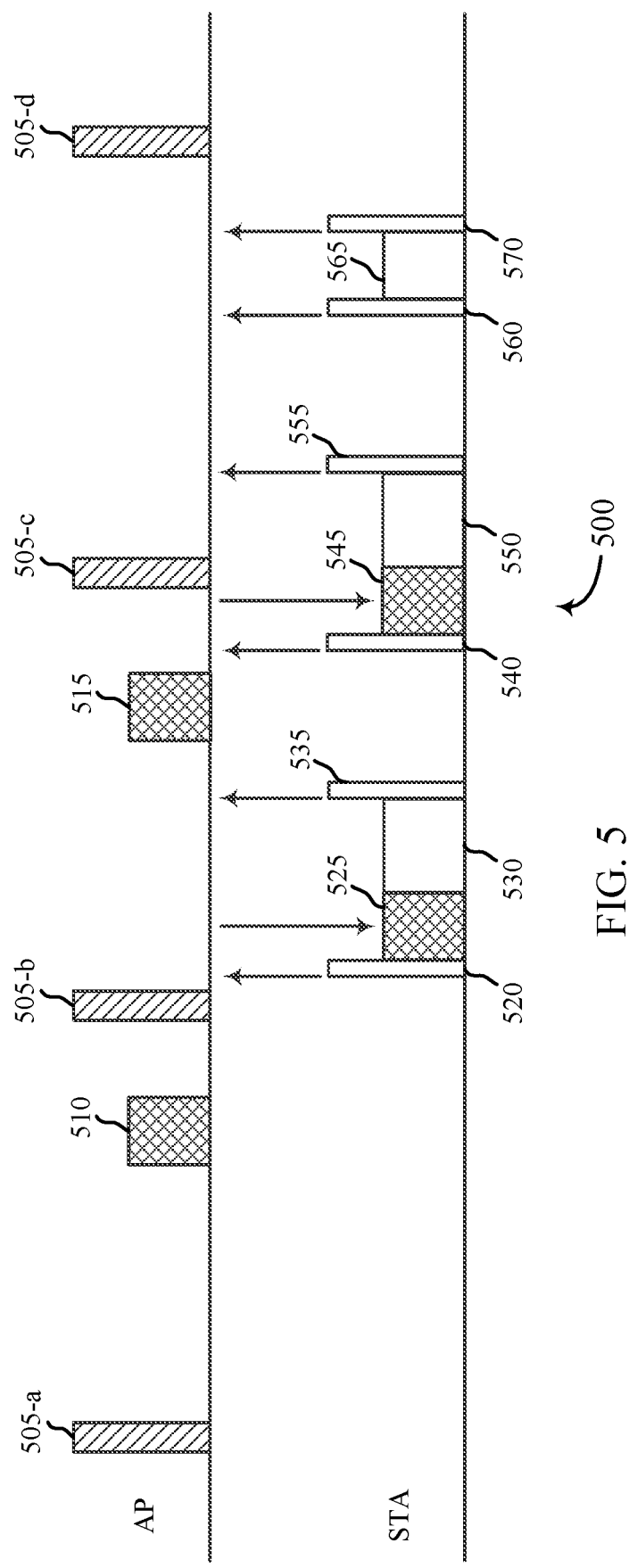
FIG. 5 illustrates an example of a power save configuration that supports adaptive power save with reinforcement learning in accordance with aspects of the present disclosure.

FIG. 5 illustrates an example of a power save configuration 500 that supports adaptive power save with reinforcement learning in accordance with various aspects of the present disclosure. Power save configuration 500 may implement aspect(s) of WLAN 100, process 200, and/or power save configurations 300/400 described above. Power save configuration 500 may be implemented by a STA and/or AP, which may be examples of the corresponding devices described herein.

Power save configuration 500 may include an AP transmitting beacons 505, with beacons 505-*a*, 505-*b*, 505-*c*, and 505-*d* being shown by way of example. The AP may receive data 510 buffered for the STA. Accordingly, the beacon 505-*b* may be a TIM beacon that conveys an indication that the AP has data stored for the STA.

The STA may receive the TIM beacon 505-*b* and respond by transmitting a power mode change 520 to the AP. The power mode change 520 may include or be a data or QoS null message that includes a power mode bit set to zero to indicate that the STA has entered an active mode. In response to the power mode change 520, the AP may transmit and the STA may receive the data during data period 525. In this example, all of the data being buffered at the AP is received during the data period 525. Once the data has been exchanged, the STA may initiate an inactivity timer during ITO period 530. The ITO period 530 may be a common ITO period which may be shorter than a fixed ITO period (e.g., as used in the legacy power save configuration), but may be longer than an alternative ITO period. At the end of the ITO period 530 and with no data being exchanged, the STA may transmit a power mode change 535 to the AP that indicates the STA is entering a sleep mode. For example, the power mode change 535 may include a power mode bit set to one to indicate that the STA is entering a sleep mode.

The AP may receive additional data 515 for the STA. Subsequently, but prior to the AP transmitting a TIM beacon (e.g., what would have been beacon 505-*c*), the STA may determine to perform a speculative wakeup in accordance with the described techniques. For example, the STA may monitor the traffic indicator metrics while in the sleep mode and determine if and when to perform the speculative wakeup. Thus, the STA may transmit a power mode change 540 to the AP. The power mode change 540 may include a data or QoS null message that includes a power mode bit set to zero to indicate that the STA has entered an active mode. In response to the power mode change 540, the AP may transmit and the STA may receive the data during data period 545. In this example, all of the data being buffered at the AP is received during the data period 545. Once the data has been exchanged, the STA may initiate an inactivity timer during ITO period 550. The ITO period 550 may be a common ITO period which may be shorter than a fixed ITO period (e.g., as used in the legacy power save configuration), but may be longer than an alternative ITO period. At the end of the ITO period 550 and with no data being exchanged, the STA may transmit a power mode change 555 to the AP that indicates the STA is entering a sleep mode. For example, the power mode change 555 may include a power mode bit set to one to indicate that the STA is entering a sleep mode.

Subsequently, the STA may again determine to perform a speculative wakeup in accordance with the described techniques. For example, the STA may transmit a power mode change 560 to the AP with the power management bit set to zero. The STA may then wait for a data exchange during an alternative ITO period 565. The alternative ITO period 565 may be based on an ITO LUT that is continuously updated according to the described techniques. At the end of the alternative ITO period 565 and with no data being exchanged, the STA may again switch to the sleep mode to conserve power.

Figure 6:
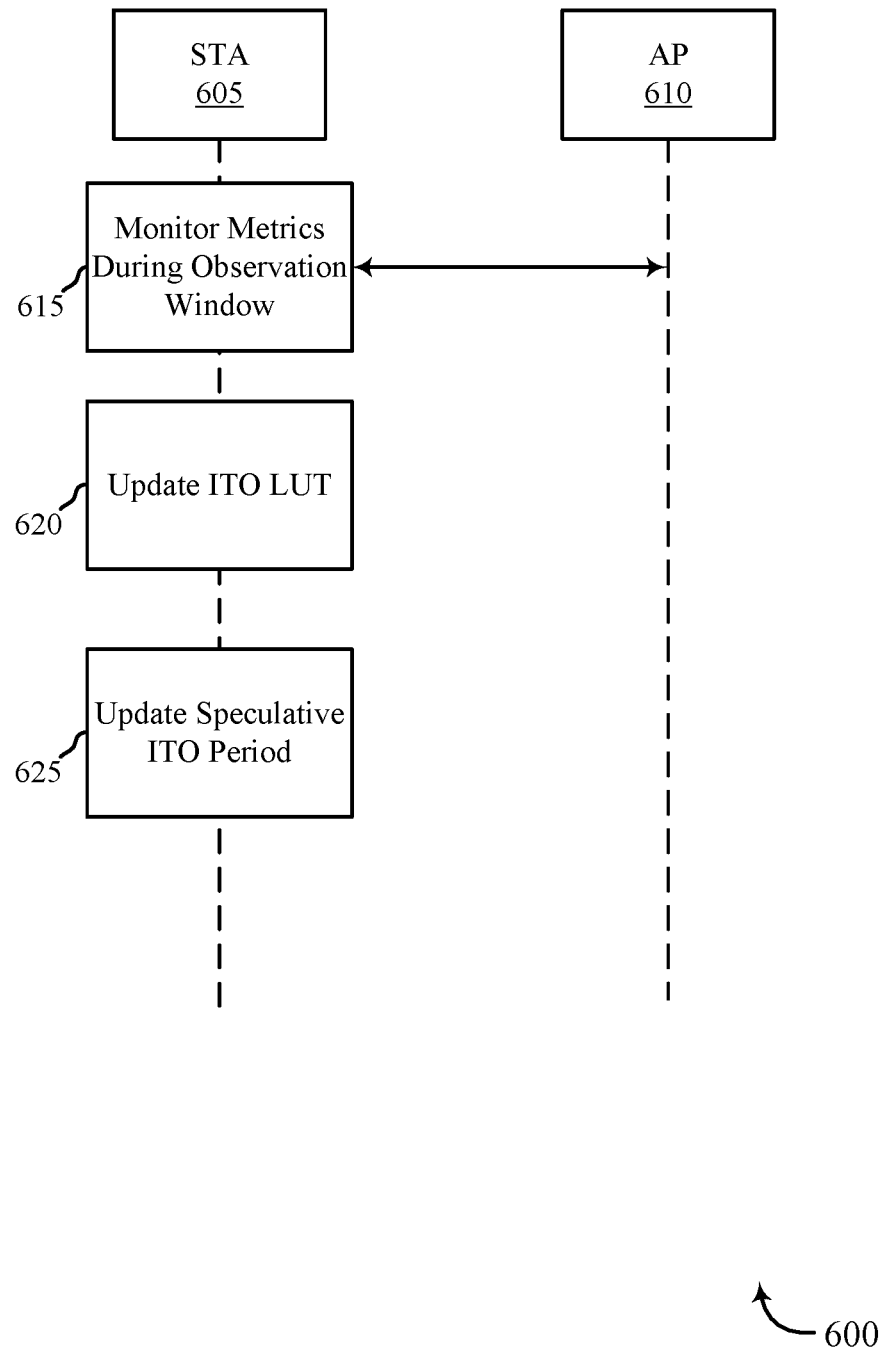
FIG. 6 illustrates an example of a process that supports adaptive power save with reinforcement learning in accordance with aspects of the present disclosure.

FIG. 6 illustrates an example of a process 600 that supports adaptive power save with reinforcement learning in accordance with various aspects of the present disclosure. Process 600 may implement aspect(s) of WLAN 100, process 200, and/or power save configurations 300/400/500 described herein. Process 600 may include a STA 605 and an AP 610, which may be examples of the corresponding devices described herein.

Broadly, process 600 illustrates one example of the STA 605 adapting or updating an ITO LUT by deriving a cost/benefit analysis associated with performing speculative wakeups and applying reinforcement learning to the analysis. The analysis may include closed loop feedback based on multi-dimensional cost function maximization against a reward.

At 615, STA 605 may monitor metric(s) associated with power mode changes during an observation window. The power mode changes may refer to the STA 605 switching from an active mode to a sleep mode, and vice versa.

In one example of a first cost metric, when a number of TIM advertisements to STA 605 within a given observation window is high (or is gradually increasing), this may indicate that STA 605 is in a sleep mode more frequently and this may result in reduced throughput or impact latency sensitive applications. This metric may be used to determine to perform speculative wakeups more frequently and/or extending the ITO period in the alternate ITO LUT. The STA 605 may update the rate that it performs speculative wakeups based on the number of TIM messages it receives, e.g., within the observation window. In some aspects, STA 605 may determine a latency for data communications and update the rate at which it performs speculative wakeups based on the latency. For example, this may address latency impact when the STA 605 is too aggressive (or not aggressive enough) in performing speculative wakeups.

In another example of a metric, when a predefined percentage of speculative wakeups within a given observation window do not result in data being exchanged, this may indicate that STA 605 is performing an excessive number of speculative wakeups, which may result in a power penalty. This metric may be used to determine to reduce the frequency and/or number of speculative wakeups and/or contract the ITO period in the alternate ITO LUT.

In another example of a metric, the primary or common ITO period may be extended when the DTIM interval is high to reduce round trip time (RTT) when the power mode change is absent.

At 620, STA 605 may update value(s) in an ITO LUT based on the metrics. The ITO LUT may refer to ITO time values corresponding to a common ITO period and/or an alternative ITO period, as is described herein. Updating the value(s) may include extending or contracting the time period associated with a speculative wakeup period (e.g., the alternative ITO period). In some aspects, updating the value (s) may include determining to perform speculative wakeups more or less frequently.

At 625, STA 605 may update an ITO period based on the updated ITO LUT. The ITO period may refer to the common ITO period and/or the alternative ITO period described herein.

Figure 7:
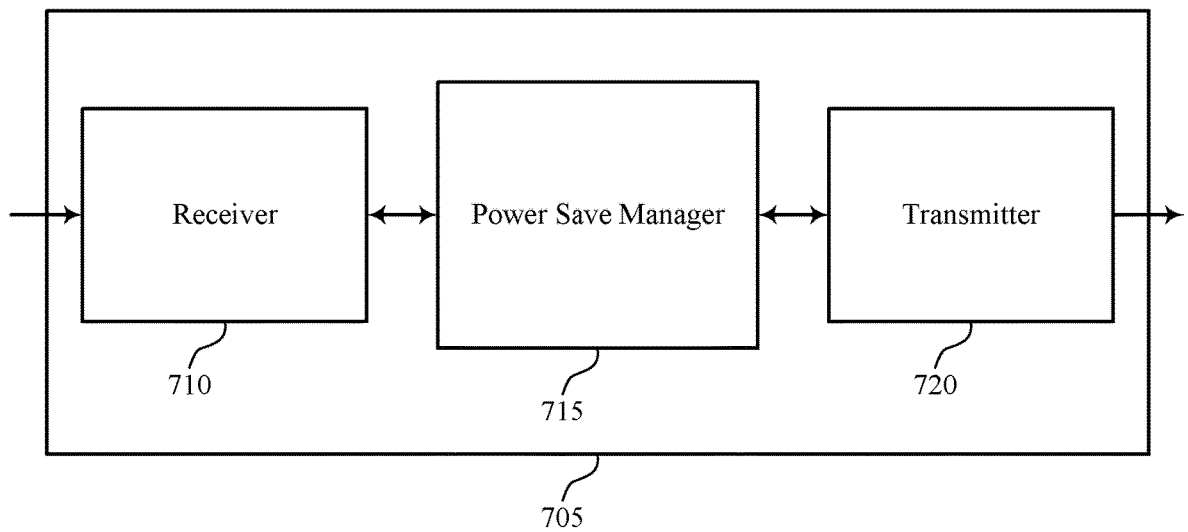
FIGS. 7 through 9 show block diagrams of a device that supports adaptive power save with reinforcement learning in accordance with aspects of the present disclosure.

FIG. 7 shows a block diagram 700 of a wireless device 705 that supports adaptive power save with reinforcement learning in accordance with various aspects of the present disclosure. Wireless device 705 may be an example of aspects of a STA 115 as described with reference to FIG. 1. wireless device 705 may include a receiver 710, a power save manager 715, and a transmitter 720. wireless device 705 may also include a processor. Each of these components may be in communication with one another (e.g., via one or more buses).

Receiver 710 may receive information such as packets, user data, or control information associated with various information channels (e.g., control channels, data channels, and information related to adaptive power save with reinforcement learning, etc.). Information may be passed on to other components of the device. The receiver 710 may be an example of aspects of the transceiver 1035 described with reference to FIG. 10.

Power save manager 715 may be an example of aspects of the power save manager 1015 described with reference to FIG. 10.

Power save manager 715 and/or at least some of its various sub-components may be implemented in hardware, software executed by a processor, firmware, or any combination thereof. If implemented in software executed by a processor, the functions of the power save manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The power save manager 715 and/or at least some of its various sub-components may be physically located at various positions, including being distributed such that portions of functions are implemented at different physical locations by one or more physical devices. In some examples, power save manager 715 and/or at least some of its various sub-components may be a separate and distinct component in accordance with various aspects of the present disclosure. In other examples, power save manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Power save manager 715 may communicate, while in a first power mode, with an AP during a first active communication period. Power save manager 715 may switch to a second power mode to transition to a sleep period. Power save manager 715 may determine, based on a traffic indicator metric, whether to perform a speculative wakeup and switch to the first power mode at the end of the sleep mode.

Additionally or alternatively, the power save manager 715 may also monitor, at a wireless station and during an observation window, one or more metrics associated with power mode changes. Power save manager 715 may update one or more values of an ITO LUT based on the one or more metrics. Power save manager 715 may update an ITO period based on the updated ITO LUT.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
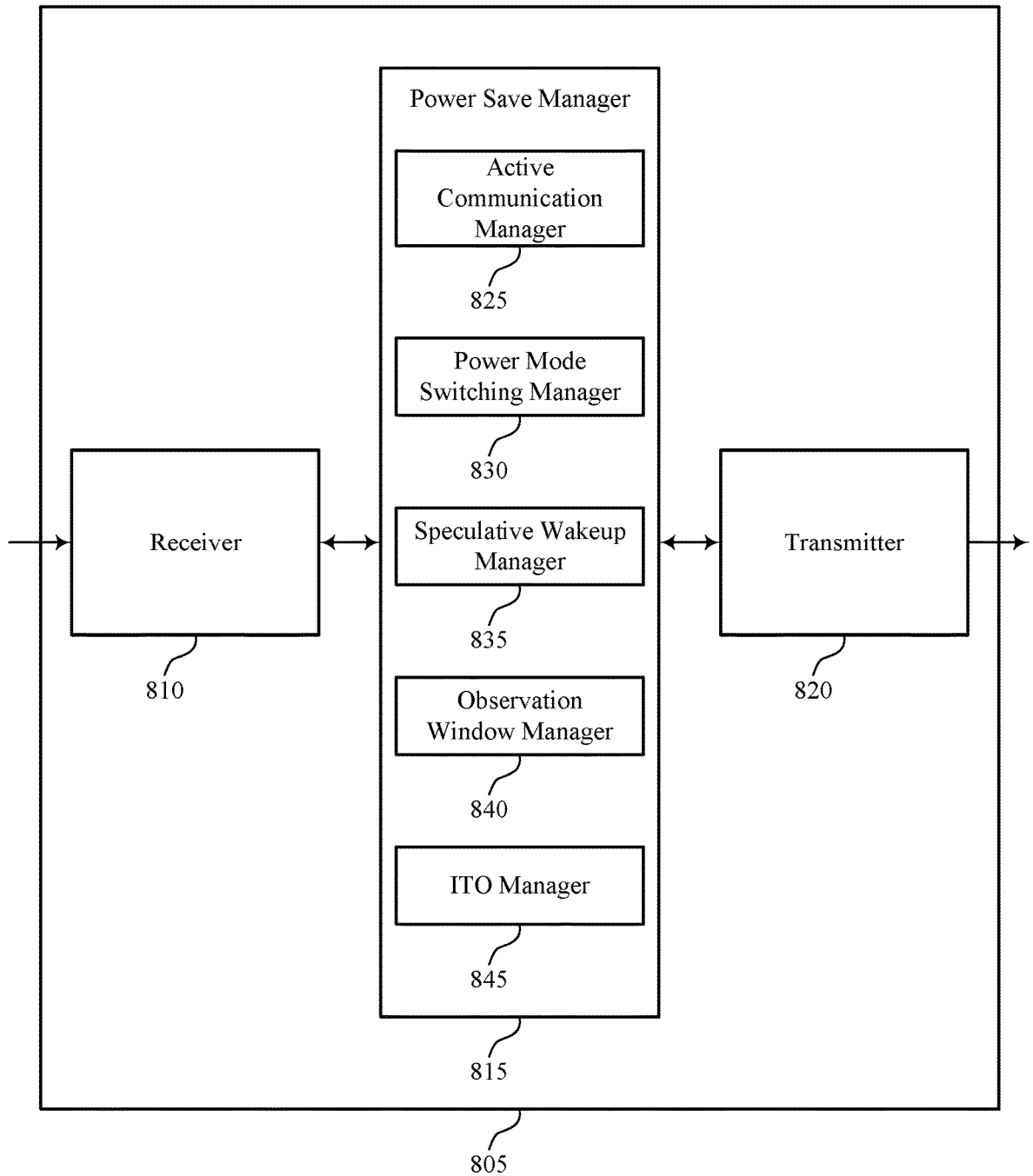

FIG. 8 shows a block diagram 800 of a wireless device 805 that supports adaptive power save with reinforcement learning in accordance with various aspects of the present disclosure. Wireless device 805 may be an example of aspects of a wireless device 705 or a STA 115 as described with reference to FIGS. 1 through 7. wireless device 805 may include a receiver 810, a power save manager 815, and a transmitter 820. wireless device 805 may also include a processor. Each of these components may be in communication with one another (e.g., via one or more buses).

Receiver 810 may receive information such as packets, user data, or control information associated with various information channels (e.g., control channels, data channels, and information related to adaptive power save with reinforcement learning, etc.). Information may be passed on to other components of the device. The receiver 810 may be an example of aspects of the transceiver 1035 described with reference to FIG. 10.

Power save manager 815 may be an example of aspects of the power save manager 1015 described with reference to FIG. 10. Power save manager 815 may also include an active communication manager 825, a power mode switching manager 830, a speculative wakeup manager 835, an observation window manager 840, and an ITO manager 845.

Active communication manager 825 may communicate, while in a first power mode, with an AP during a first active communication period. Power mode switching manager 830 may switch to a second power mode to transition to a sleep period.

Speculative wakeup manager 835 may determine, based on a traffic indicator metric, whether to perform a speculative wakeup and switch to the first power mode at the end of the sleep mode. Speculative wakeup manager 835 may determine to perform the speculative wakeup and switch to the first power mode. Speculative wakeup manager 835 may determine that a previous speculative wakeup failed to result in data communications. Speculative wakeup manager 835 may determine not to perform the speculative wakeup and switch to the first power mode. Speculative wakeup manager 835 may determine, based on the beacon transmission time, not to perform a speculative wakeup and switch to the first power mode.

Observation window manager 840 may identify an observation window associated with a set of speculative wakeups. Observation window manager 840 may monitor, at a wireless station and during an observation window, one or more metrics associated with power mode changes. In some cases, monitoring one or more metrics associated with power mode changes further includes: monitoring, during the observation window, a number of speculative wakeups that result in data communications.

ITO manager 845 may use a first ITO associated with the first active communication period. ITO manager 845 may use a second ITO associated with the speculative wakeup, where the second ITO is shorter in time than the first ITO. ITO manager 845 may determine that data is being communicated during a speculative wakeup. ITO manager 845 may switch from the second ITO to the first ITO during the speculative wakeup. ITO manager 845 may update one or more values of an ITO LUT based on the one or more metrics. ITO manager 845 may update an ITO period based on the updated ITO LUT. ITO manager 845 may update the ITO LUT to extend the ITO period based on the number of TIM messages exceeding a threshold value. ITO manager 845 may update the ITO LUT to contract an ITO period based on the number of speculative wakeups resulting in data communications falling below a threshold value.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
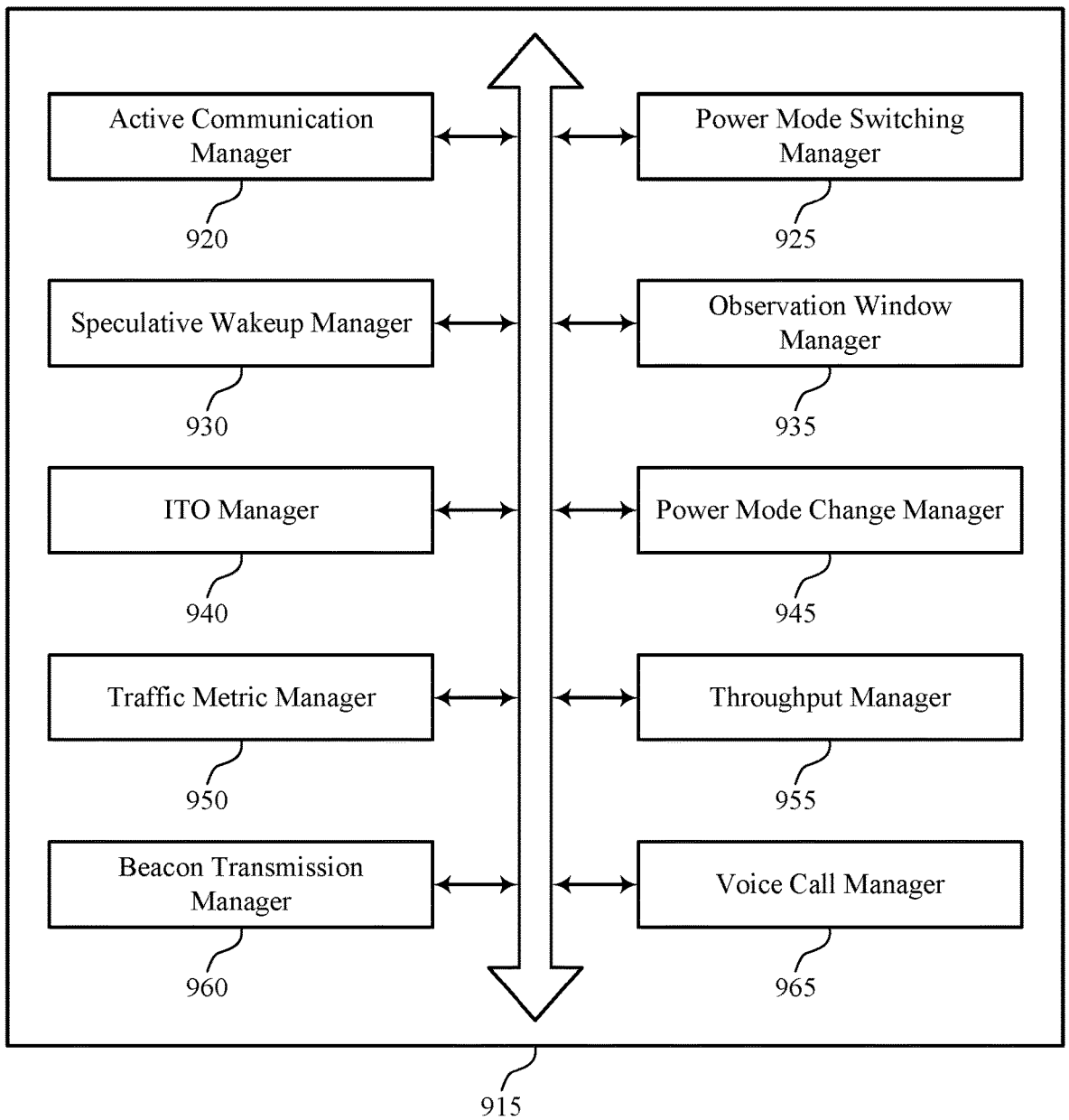

FIG. 9 shows a block diagram 900 of a power save manager 915 that supports adaptive power save with reinforcement learning in accordance with various aspects of the present disclosure. The power save manager 915 may be an example of aspects of a power save manager 715, a power save manager 815, or a power save manager 1015 described with reference to FIGS. 7, 8, and 10. The power save manager 915 may include an active communication manager 920, a power mode switching manager 925, a speculative wakeup manager 930, an observation window manager 935, an ITO manager 940, a power mode change manager 945, a traffic metric manager 950, a throughput manager 955, a beacon transmission manager 960, and a voice call manager 965. Each of these modules may communicate, directly or indirectly, with one another (e.g., via one or more buses).

Active communication manager 920 may communicate, while in a first power mode, with an AP during a first active communication period. Power mode switching manager 925 may switch to a second power mode to transition to a sleep period.

Speculative wakeup manager 930 may determine, based on a traffic indicator metric, whether to perform a speculative wakeup and switch to the first power mode at the end of the sleep mode. Speculative wakeup manager 930 may determine to perform the speculative wakeup and switch to the first power mode. Speculative wakeup manager 930 may determine that a previous speculative wakeup failed to result in data communications. Speculative wakeup manager 930 may determine not to perform the speculative wakeup and switch to the first power mode. Speculative wakeup manager 930 may determine, based on the beacon transmission time, not to perform a speculative wakeup and switch to the first power mode.

Observation window manager 935 may identify an observation window associated with a set of speculative wakeups and monitor, at a wireless station and during an observation window, one or more metrics associated with power mode changes. In some cases, monitoring one or more metrics associated with power mode changes further includes: monitoring, during the observation window, a number of speculative wakeups that result in data communications. In some cases, monitoring one or more metrics associated with power mode changes further includes: updating a rate for performing speculative wakeups based at least in part on the number of received TIM messages. Observation window manager 935 may determine whether a downlink activity level during the observation window has exceeded a first threshold value; and determine whether an uplink activity level during the observation window has exceeded a second threshold value, wherein the traffic indicator metric is based on part on the downlink and/or uplink activity levels exceeding the first and second threshold values. Observation window manager 935 may determine whether a downlink throughput level during the observation window has exceeded a first threshold value; and determine whether an uplink throughput level during the observation window has exceeded a second threshold value, wherein the traffic indicator metric is based on part on the downlink and/or uplink throughput levels exceeding the first and second threshold values.

ITO manager 940 may use a first ITO associated with the first active communication period. ITO manager 940 may use a second ITO associated with the speculative wakeup, where the second ITO is shorter in time than the first ITO. ITO manager 940 may determine that data is being communicated during a speculative wakeup, switch from the second ITO to the first ITO during the speculative wakeup. ITO manager 940 may update one or more values of an ITO LUT based on the one or more metrics. ITO manager 940 may update an ITO period based on the updated ITO LUT. ITO manager 940 may update the ITO LUT to extend the ITO period based on the number of TIM messages exceeding a threshold value. ITO manager 940 may update the ITO LUT to contract an ITO period based on the number of speculative wakeups resulting in data communications falling below a threshold value.

Power mode change manager 945 may transmit a data null message that includes a power management bit, the power management bit being set to zero to facilitate switching to the first power mode. In some cases, monitoring one or more metrics associated with power mode changes further includes: monitoring, during the observation window, a RTT of traffic to and from the wireless station.

Traffic metric manager 950 may determine that a traffic activity level during the first active communication period has exceeded a threshold value, where the traffic indicator metric is based on the traffic activity level exceeding the threshold value. Traffic metric manager 950 may determine that a traffic congestion level has exceeded a threshold value, where the traffic indicator metric is based on the traffic congestion level exceeding the threshold value. Traffic metric manager 950 may determine whether a downlink activity level during a predetermined number of the set of speculative wakeups has exceeded a first threshold value. Traffic metric manager 950 may determine whether an uplink activity level during the predetermined number of the set of speculative wakeups has exceeded a second threshold value, where the traffic indicator metric is based on the downlink and uplink activity levels exceeding the first and second threshold values. Traffic metric manager 950 may monitor a traffic congestion metric, and update the ITO LUT table to determine the updated ITO period based on the traffic congestion metric. In some cases, monitoring one or more metrics associated with power mode changes further includes: monitoring, during the observation window, a number of traffic indicator map (TIM) messages received for the wireless station.

Throughput manager 955 may determine whether a downlink throughput level during a predetermined number of the set of speculative wakeups has exceeded a first threshold value. Throughput manager 955 may determine whether an uplink throughput level during the predetermined number of the set of speculative wakeups has exceeded a second threshold value, where the traffic indicator metric is based on the downlink and uplink throughput levels exceeding the first and second threshold values.

Beacon transmission manager 960 may determine that a beacon transmission time is within a predefined time period from the end of the sleep period.

Voice call manager 965 may detect, during the sleep period, that a voice call is ongoing. Voice call manager 965 may determine, based on the ongoing voice call, to perform the speculative wakeup and switch to the first power mode.

Figure 10:
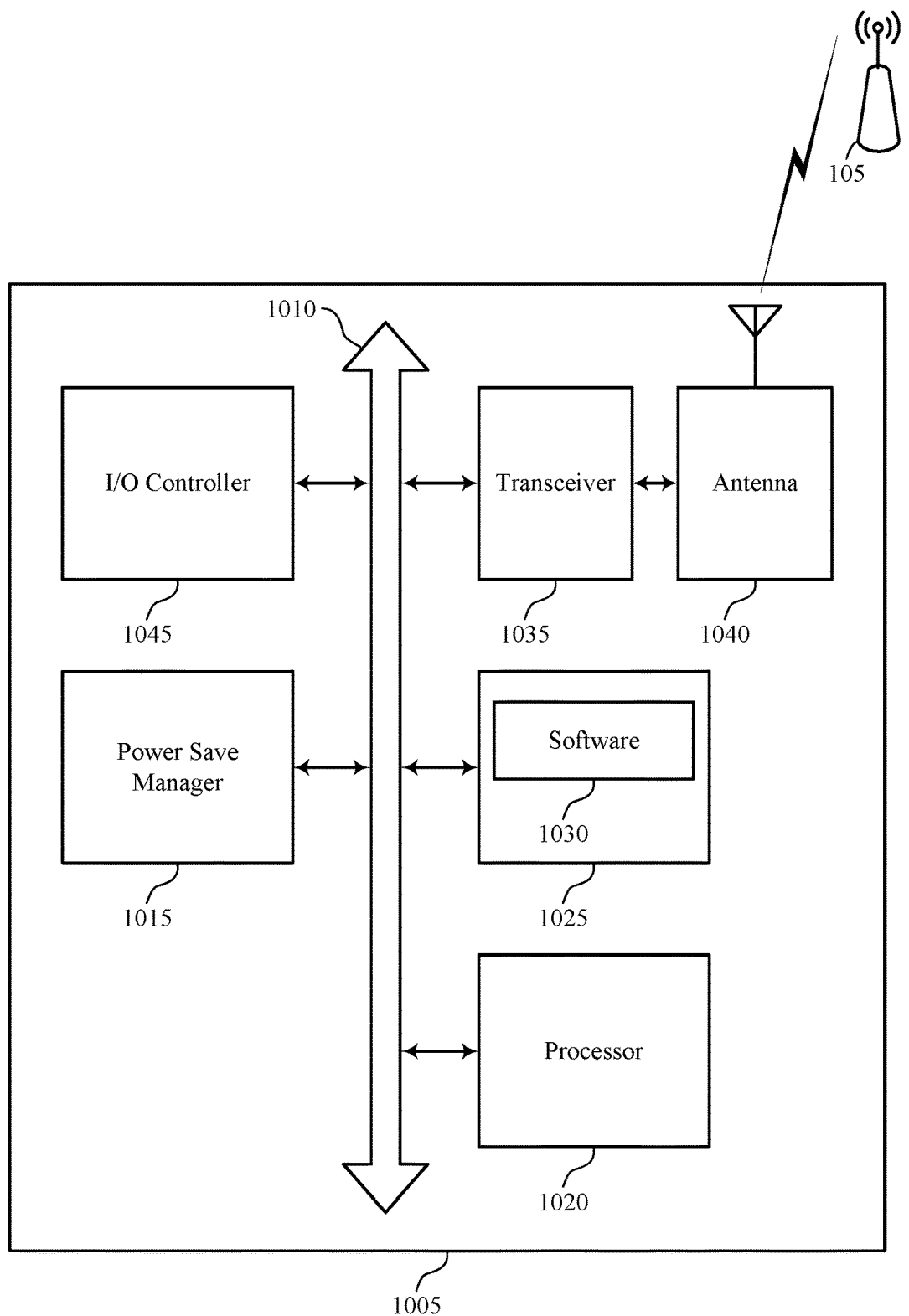
FIG. 10 illustrates a block diagram of a system including a wireless station (STA) that supports adaptive power save with reinforcement learning in accordance with aspects of the present disclosure.

FIG. 10 shows a diagram of a system 1000 including a device 1005 that supports adaptive power save with reinforcement learning in accordance with various aspects of the present disclosure. Device 1005 may be an example of or include the components of wireless device 705, wireless device 805, or a STA 115 as described above, e.g., with reference to FIGS. 1 through 8. Device 1005 may include components for bi-directional voice and data communications including components for transmitting and receiving communications, including a power save manager 1015, a processor 1020, a memory 1025, a software 1030, a transceiver 1035, an antenna 1040, and an I/O controller 1045. These components may be in electronic communication via one or more busses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting adaptive power save with reinforcement learning).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support adaptive power save with reinforcement learning. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
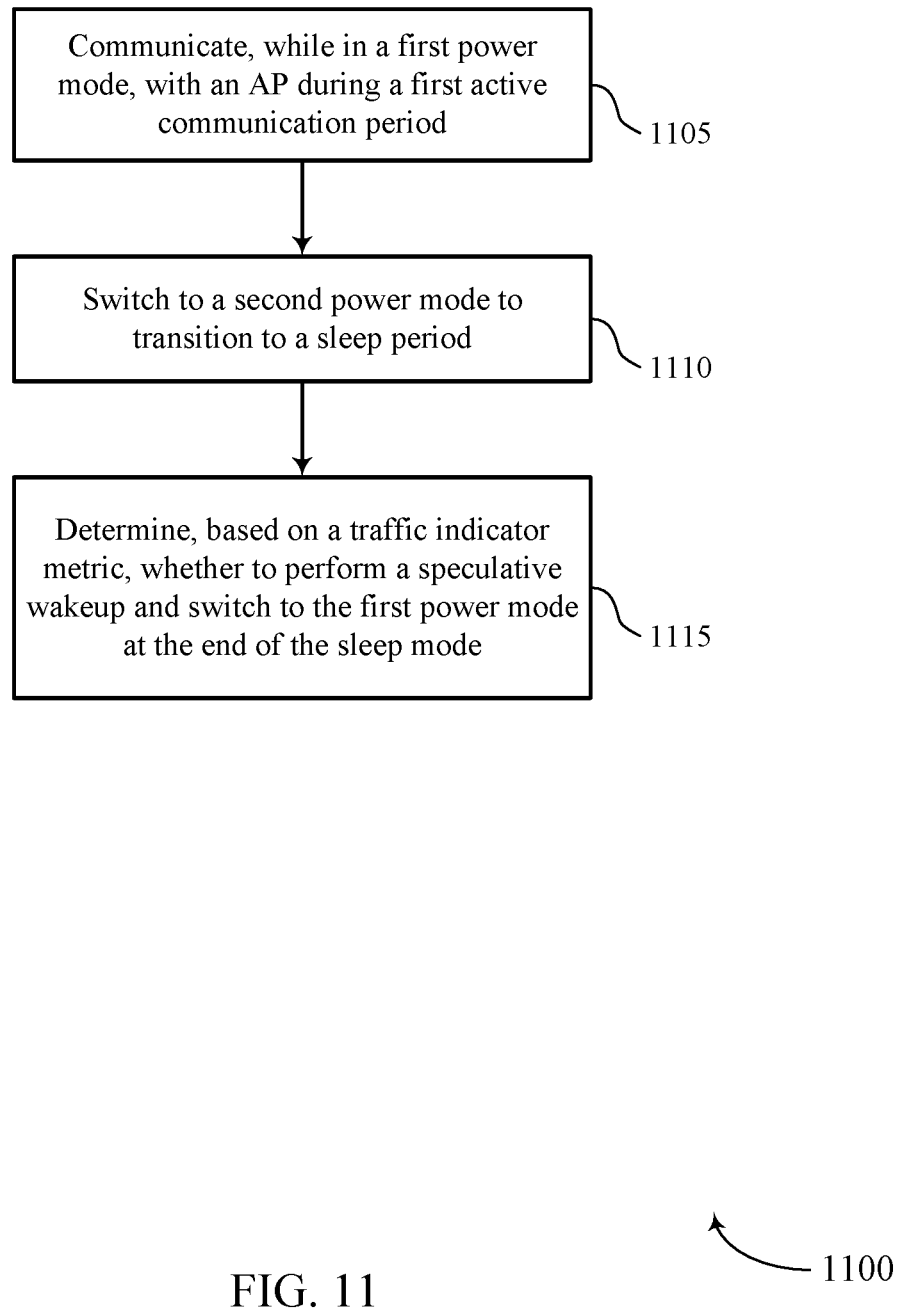
FIGS. 11 through 14 illustrate methods for adaptive power save with reinforcement learning in accordance with aspects of the present disclosure.

FIG. 11 shows a flowchart illustrating a method 1100 for adaptive power save with reinforcement learning in accordance with various aspects of the present disclosure. The operations of method 1100 may be implemented by a STA 115 or its components as described herein. For example, the operations of method 1100 may be performed by a power save manager as described with reference to FIGS. 7 through 10. In some examples, a STA 115 may execute a set of codes to control the functional elements of the device to perform the functions described below. Additionally or alternatively, the STA 115 may perform aspects of the functions described below using special-purpose hardware.

At block 1105 the STA 115 may communicate, while in a first power mode, with an AP during a first active communication period. The operations of block 1105 may be performed according to the methods described with reference to FIGS. 1 through 6. In certain examples, aspects of the operations of block 1105 may be performed by a active communication manager as described with reference to FIGS. 7 through 10.

At block 1110 the STA 115 may switch to a second power mode to transition to a sleep period. The operations of block 1110 may be performed according to the methods described with reference to FIGS. 1 through 6. In certain examples, aspects of the operations of block 1110 may be performed by a power mode switching manager as described with reference to FIGS. 7 through 10.

At block 1115 the STA 115 may determine, based at least in part on a traffic indicator metric, whether to perform a speculative wakeup and switch to the first power mode at the end of the sleep mode. The operations of block 1115 may be performed according to the methods described with reference to FIGS. 1 through 6. In certain examples, aspects of the operations of block 1115 may be performed by a speculative wakeup manager as described with reference to FIGS. 7 through 10.

Figure 12:
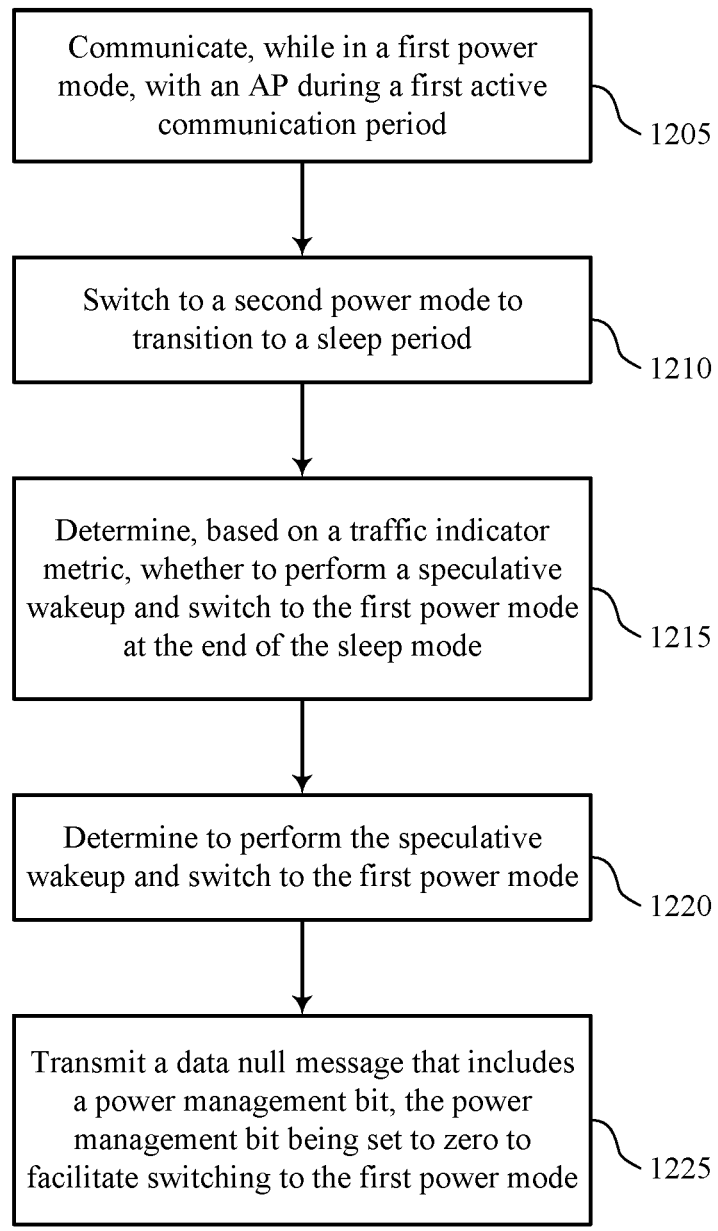

FIG. 12 shows a flowchart illustrating a method 1200 for adaptive power save with reinforcement learning in accordance with various aspects of the present disclosure. The operations of method 1200 may be implemented by a STA 115 or its components as described herein. For example, the operations of method 1200 may be performed by a power save manager as described with reference to FIGS. 7 through 10. In some examples, a STA 115 may execute a set of codes to control the functional elements of the device to perform the functions described below. Additionally or alternatively, the STA 115 may perform aspects of the functions described below using special-purpose hardware.

At block 1205 the STA 115 may communicate, while in a first power mode, with an AP during a first active communication period. The operations of block 1205 may be performed according to the methods described with reference to FIGS. 1 through 6. In certain examples, aspects of the operations of block 1205 may be performed by a active communication manager as described with reference to FIGS. 7 through 10.

At block 1210 the STA 115 may switch to a second power mode to transition to a sleep period. The operations of block 1210 may be performed according to the methods described with reference to FIGS. 1 through 6. In certain examples, aspects of the operations of block 1210 may be performed by a power mode switching manager as described with reference to FIGS. 7 through 10.

At block 1215 the STA 115 may determine, based at least in part on a traffic indicator metric, whether to perform a speculative wakeup and switch to the first power mode at the end of the sleep mode. The operations of block 1215 may be performed according to the methods described with reference to FIGS. 1 through 6. In certain examples, aspects of the operations of block 1215 may be performed by a speculative wakeup manager as described with reference to FIGS. 7 through 10.

At block 1220 the STA 115 may determine to perform the speculative wakeup and switch to the first power mode. The operations of block 1220 may be performed according to the methods described with reference to FIGS. 1 through 6. In certain examples, aspects of the operations of block 1220 may be performed by a speculative wakeup manager as described with reference to FIGS. 7 through 10.

At block 1225 the STA 115 may transmit a data null message that comprises a power management bit, the power management bit being set to zero to facilitate switching to the first power mode. The operations of block 1225 may be performed according to the methods described with reference to FIGS. 1 through 6. In certain examples, aspects of the operations of block 1225 may be performed by a power mode change manager as described with reference to FIGS. 7 through 10.

Figure 13:
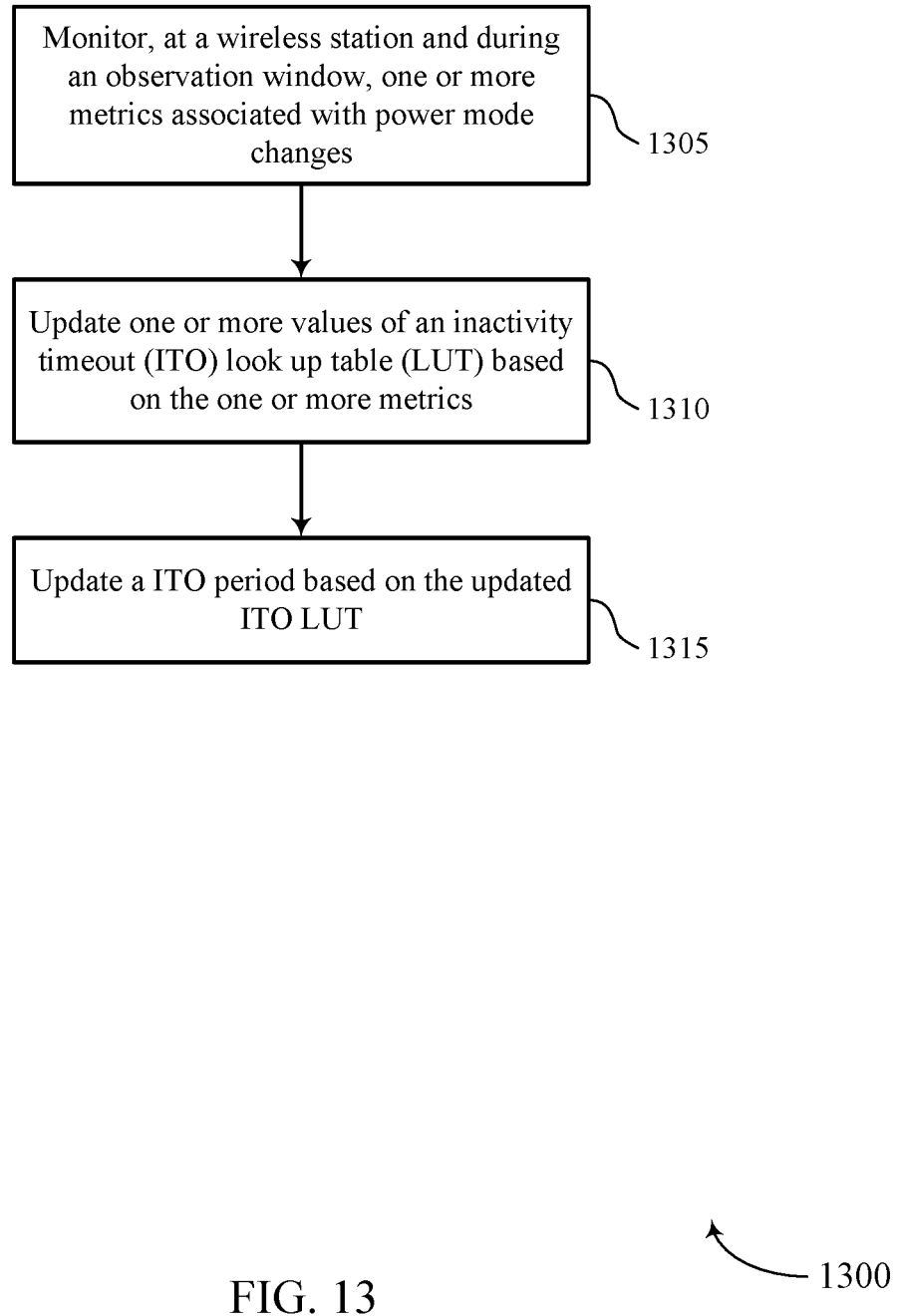

FIG. 13 shows a flowchart illustrating a method 1300 for adaptive power save with reinforcement learning in accordance with various aspects of the present disclosure. The operations of method 1300 may be implemented by a STA 115 or its components as described herein. For example, the operations of method 1300 may be performed by a power save manager as described with reference to FIGS. 7 through 10. In some examples, a STA 115 may execute a set of codes to control the functional elements of the device to perform the functions described below. Additionally or alternatively, the STA 115 may perform aspects of the functions described below using special-purpose hardware.

At block 1305 the STA 115 may monitor, at a wireless station and during an observation window, one or more metrics associated with power mode changes. The operations of block 1305 may be performed according to the methods described with reference to FIGS. 1 through 6. In certain examples, aspects of the operations of block 1305 may be performed by an observation window manager as described with reference to FIGS. 7 through 10.

At block 1310 the STA 115 may update one or more values of an ITO LUT based on the one or more metrics. The operations of block 1310 may be performed according to the methods described with reference to FIGS. 1 through 6. In certain examples, aspects of the operations of block 1310 may be performed by an ITO manager as described with reference to FIGS. 7 through 10.

At block 1315 the STA 115 may update an ITO period based at least in part on the updated ITO LUT. The operations of block 1315 may be performed according to the methods described with reference to FIGS. 1 through 6. In certain examples, aspects of the operations of block 1315 may be performed by an ITO manager as described with reference to FIGS. 7 through 10.

Figure 14:
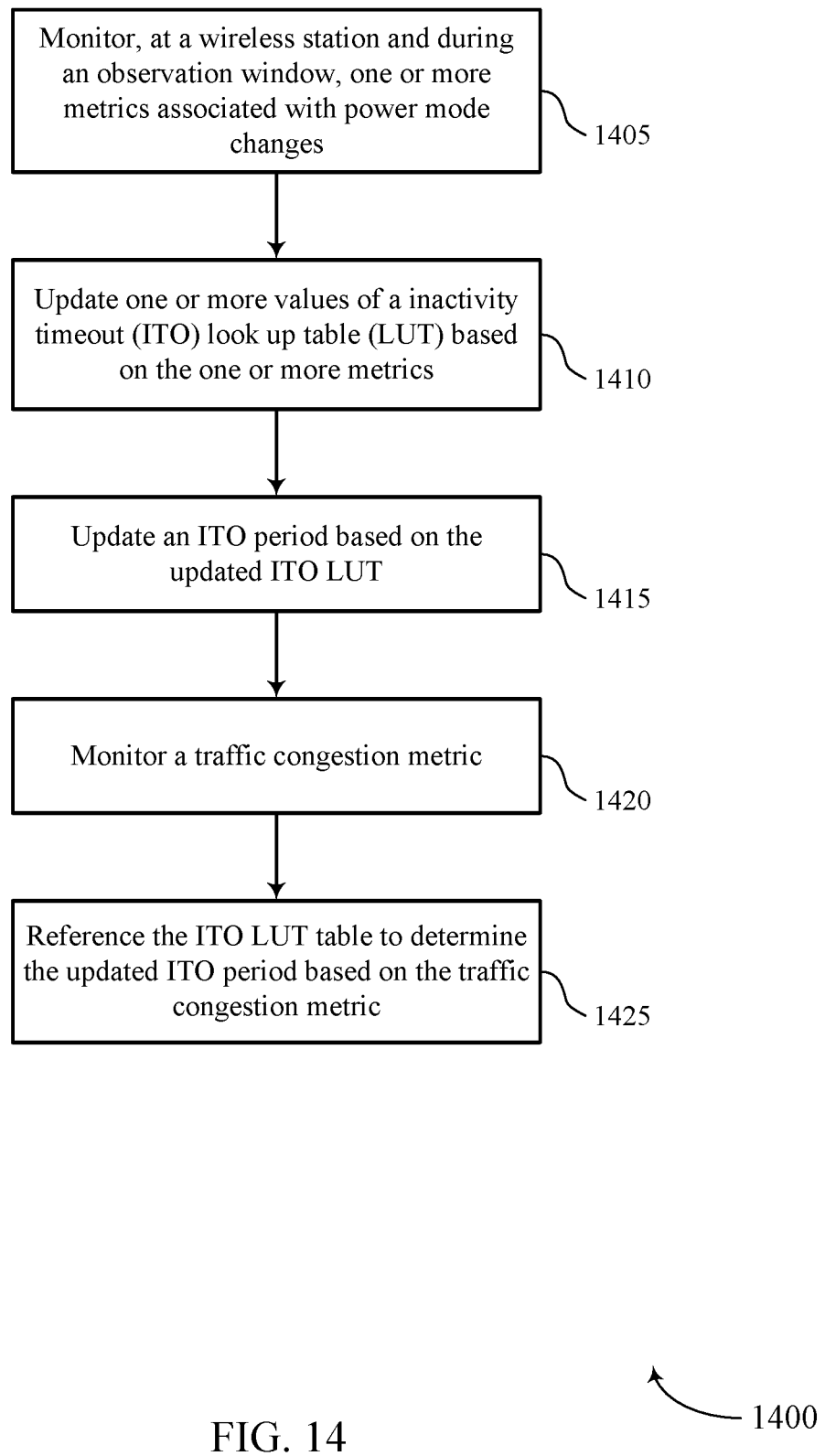

FIG. 14 shows a flowchart illustrating a method 1400 for adaptive power save with reinforcement learning in accordance with various aspects of the present disclosure. The operations of method 1400 may be implemented by a STA 115 or its components as described herein. For example, the operations of method 1400 may be performed by a power save manager as described with reference to FIGS. 7 through 10. In some examples, a STA 115 may execute a set of codes to control the functional elements of the device to perform the functions described below. Additionally or alternatively, the STA 115 may perform aspects of the functions described below using special-purpose hardware.

At block 1405 the STA 115 may monitor, at a wireless station and during an observation window, one or more metrics associated with speculative power mode changes. The operations of block 1405 may be performed according to the methods described with reference to FIGS. 1 through 6. In certain examples, aspects of the operations of block 1405 may be performed by an observation window manager as described with reference to FIGS. 7 through 10.

At block 1410 the STA 115 may update one or more values of an ITO LUT based on the one or more metrics. The operations of block 1410 may be performed according to the methods described with reference to FIGS. 1 through 6. In certain examples, aspects of the operations of block 1410 may be performed by an ITO manager as described with reference to FIGS. 7 through 10.

At block 1415 the STA 115 may update an ITO period based at least in part on the updated ITO LUT. The operations of block 1415 may be performed according to the methods described with reference to FIGS. 1 through 6. In certain examples, aspects of the operations of block 1415 may be performed by an ITO manager as described with reference to FIGS. 7 through 10.

At block 1420 the STA 115 may monitor a traffic congestion metric. The operations of block 1420 may be performed according to the methods described with reference to FIGS. 1 through 6. In certain examples, aspects of the operations of block 1420 may be performed by a traffic metric manager as described with reference to FIGS. 7 through 10.

At block 1425 the STA 115 may reference the ITO LUT table to determine the updated ITO period based on the traffic congestion metric. The operations of block 1425 may be performed according to the methods described with reference to FIGS. 1 through 6. In certain examples, aspects of the operations of block 1425 may be performed by a traffic metric manager as described with reference to FIGS. 7 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
communicating, while in a first power mode associated with an active communication state, with an access point (AP), wherein data packets can be exchanged with the AP while in the first power mode;
switching to a second power mode associated with a sleep state based at least in part on a first inactivity timeout (ITO) associated with the active communication state, wherein data packets cannot be exchanged with the AP while in the second power mode;
selecting a second ITO that is shorter in time than the first ITO based at least in part on a traffic indicator metric associated with an observation window associated with a plurality of speculative wakeups from the sleep state, the traffic indicator metric being associated with a quantity of traffic indicator map messages received from the AP during the observation window; and
performing, based at least in part on the traffic indicator metric being less than a traffic indicator map message threshold, an additional speculative wakeup and switching to the first power mode, wherein a duration of the additional speculative wakeup is based at least in part on the second ITO.

2. The method of claim 1, further comprising:
transmitting a data null message that comprises a power management bit, the power management bit being set to zero to facilitate switching to the first power mode.

3. The method of claim 1, further comprising:
determining that a traffic activity level during the first active communication state has exceeded a threshold value, wherein the traffic indicator metric is based at least in part on the traffic activity level exceeding the threshold value.

4. The method of claim 1, further comprising:
determining that a traffic congestion level has exceeded a threshold value, wherein the traffic indicator metric is based at least in part on the traffic congestion level exceeding the threshold value.

5. The method of claim 1, further comprising:
determining whether a downlink activity level during a predetermined number of the plurality of speculative wakeups has exceeded a first threshold value; and determining whether an uplink activity level during the predetermined number of the plurality of speculative wakeups has exceeded a second threshold value, wherein the traffic indicator metric is based at least in part on the downlink and uplink activity levels exceeding the first and second threshold values.

6. The method of claim 1, further comprising:
determining whether a downlink throughput level during a predetermined number of the plurality of speculative wakeups has exceeded a first threshold value; and
determining whether an uplink throughput level during the predetermined number of the plurality of speculative wakeups has exceeded a second threshold value, wherein the traffic indicator metric is based at least in part on the downlink and uplink throughput levels exceeding the first and second threshold values.

7. The method of claim 1, further comprising:
determining whether a downlink activity level during the observation window has exceeded a first threshold value; and
determining whether an uplink activity level during the observation window has exceeded a second threshold value, wherein the traffic indicator metric is based at least in part on the downlink and uplink activity levels exceeding the first and second threshold values.

8. The method of claim 1, further comprising:
determining whether a downlink throughput level during the observation window has exceeded a first threshold value; and
determining whether an uplink throughput level during the observation window has exceeded a second threshold value, wherein the traffic indicator metric is based at least in part on the downlink and uplink throughput levels exceeding the first and second threshold values.

9. The method of claim 1, further comprising:
determining that no data packets were exchanged during a previous speculative wakeup; and
determining, based on the determination that no data packets were exchanged during the previous speculative wakeup, not to perform a third speculative wakeup and switch to the first power mode.

10. The method of claim 1, further comprising:
determining that data is being communicated during a speculative wakeup; and
switching from the second ITO to the first ITO during the speculative wakeup.

11. The method of claim 1, further comprising:
determining that a beacon transmission time is within a predefined time period from a transition from the sleep state to the active communication state; and
determining, based at least in part on the beacon transmission time, not to perform a speculative wakeup and switch to the first power mode.

12. The method of claim 1, further comprising:
detecting, while in the sleep state, that a voice call is ongoing; and determining, based at least in part on the ongoing voice call, to perform the additional speculative wakeup and switch to the first power mode.

13. An apparatus for wireless communications, comprising:
means for communicating, while in a first power mode associated with an active communication state, with an access point (AP), wherein data packets can be exchanged with the AP while in the first power mode;
means for switching to a second power mode associated with a sleep state based at least in part on a first inactivity timeout (ITO) associated with the active communication state, wherein data packets cannot be exchanged with the AP while in the second power mode;
means for selecting a second ITO that is shorter in time than the first ITO based at least in part on a traffic indicator metric associated with an observation window associated with a plurality of speculative wakeups from the sleep state, the traffic indicator metric being associated with a quantity of traffic indicator map messages received from the AP during the observation window; and
means for performing, based at least in part on the traffic indicator metric being less than a traffic indicator map message threshold, an additional speculative wakeup and switching to the first power mode, wherein a duration of the additional speculative wakeup is based at least in part on the second ITO.

14. An apparatus for wireless communications, comprising a processor, memory in electronic communication with the processor, and instructions stored in the memory and operable, when executed by the processor, to cause the apparatus to:
communicate, while in a first power mode associated with an active communication state, with an access point (AP), wherein data packets can be exchanged with the AP while in the first power mode;
switch to a second power mode associated with a sleep state based at least in part on a first inactivity timeout (ITO) associated with the active communication state, wherein data packets cannot be exchanged with the AP while in the second power mode;
select a second ITO that is shorter in time than the first ITO based at least in part on a traffic indicator metric associated with an observation window associated with a plurality of speculative wakeups from the sleep state, the traffic indicator metric being associated with a quantity of traffic indicator map messages received from the AP during the observation window; and
perform, based at least in part on the traffic indicator metric being less than a traffic indicator map message threshold, an additional speculative wakeup and switch to the first power mode, wherein a duration of the additional speculative wakeup is based at least in part on the second ITO.

15. The apparatus of claim 14, wherein the instructions are further executable by the processor to cause the apparatus to:
transmit a data null message that comprises a power management bit, the power management bit being set to zero to facilitate switching to the first power mode.

16. The apparatus of claim 14, wherein the instructions are further executable by the processor to cause the apparatus to:
determine that a traffic activity level during the first active communication state has exceeded a threshold value, wherein the traffic indicator metric is based at least in part on the traffic activity level exceeding the threshold value.

17. The apparatus of claim 14, wherein the instructions are further executable by the processor to cause the apparatus to:
determine that a traffic congestion level has exceeded a threshold value, wherein the traffic indicator metric is based at least in part on the traffic congestion level exceeding the threshold value.

18. The apparatus of claim 14, wherein the instructions are further executable by the processor to cause the apparatus to:
  determine whether a downlink activity level during a predetermined number of the plurality of speculative wakeups has exceeded a first threshold value; and
  determine whether an uplink activity level during the predetermined number of the plurality of speculative wakeups has exceeded a second threshold value, wherein the traffic indicator metric is based at least in part on the downlink and uplink activity levels exceeding the first and second threshold values.

19. The apparatus of claim 14, wherein the instructions are further executable by the processor to cause the apparatus to:
  determine whether a downlink throughput level during a predetermined number of the plurality of speculative wakeups has exceeded a first threshold value; and
  determine whether an uplink throughput level during the predetermined number of the plurality of speculative wakeups has exceeded a second threshold value, wherein the traffic indicator metric is based at least in part on the downlink and uplink throughput levels exceeding the first and second threshold values.

20. The apparatus of claim 14, wherein the instructions are further executable by the processor to cause the apparatus to:
  determine whether a downlink activity level during the observation window has exceeded a first threshold value; and
  determine whether an uplink activity level during the observation window has exceeded a second threshold value, wherein the traffic indicator metric is based at least in part on the downlink and uplink activity levels exceeding the first and second threshold values.

21. The apparatus of claim 14, wherein the instructions are further executable by the processor to cause the apparatus to:
  determine whether a downlink throughput level during the observation window has exceeded a first threshold value; and
  determine whether an uplink throughput level during the observation window has exceeded a second threshold value, wherein the traffic indicator metric is based at least in part on the downlink and uplink throughput levels exceeding the first and second threshold values.

22. The apparatus of claim 14, wherein the instructions are further executable by the processor to cause the apparatus to:
  determine that no data packets were exchanged during a previous speculative wakeup; and
  determine, based on the determination that no data packets were exchanged during the previous speculative wakeup, not to perform a third speculative wakeup and switch to the first power mode.

23. The apparatus of claim 14, wherein the instructions are further executable by the processor to cause the apparatus to:
  determine that data is being communicated during a speculative wakeup; and switch from the second ITO to the first ITO during the speculative wakeup.

24. The apparatus of claim 14, wherein the instructions are further executable by the processor to cause the apparatus to:
  determine that a beacon transmission time is within a predefined time period from a transition from the sleep state to the active communication state; and
  determine, based at least in part on the beacon transmission time, not to perform a speculative wakeup and switch to the first power mode.

25. The apparatus of claim 14, wherein the instructions are further executable by the processor to cause the apparatus to:
  detect, while in the sleep state, that a voice call is ongoing; and
  determine, based at least in part on the ongoing voice call, to perform the additional speculative wakeup and switch to the first power mode.

26. A non-transitory computer-readable medium storing code for wireless communications, the code comprising instructions executable by a processor to:
  communicate, while in a first power mode associated with an active communication state, with an access point (AP), wherein data packets can be exchanged with the AP while in the first power mode;
  switch to a second power mode associated with a sleep state based at least in part on a first inactivity timeout (ITO) associated with the active communication state, wherein data packets cannot be exchanged with the AP while in the second power mode;
  select a second ITO that is shorter in time than the first ITO based at least in part on a traffic indicator metric associated with an observation window associated with a plurality of speculative wakeups from the sleep state, the traffic indicator metric being associated with a quantity of traffic indicator map messages received from the AP during the observation window; and
  perform, based at least in part on the traffic indicator metric being less than a traffic indicator map message threshold, an additional speculative wakeup and switch to the first power mode, wherein a duration of the additional speculative wakeup is based at least in part on the second ITO.

* * * * *